(12) United States Patent
Cooper et al.

(10) Patent No.: US 11,648,969 B2
(45) Date of Patent: May 16, 2023

(54) VEHICLE DATA COMMUNICATION SYSTEM

(71) Applicant: Transportation IP Holdings, LLC, Norwalk, CT (US)

(72) Inventors: Jared Klineman Cooper, Palm Bay, FL (US); Robert James Foy, Melbourne, FL (US); David Michael Peltz, Melbourne, FL (US); Eugene Smith, Banner Elk, NC (US); Steven Andrew Kellner, Melbourne, FL (US); Brian William Schroeck, Melbourne, FL (US); Keith Gilbertson, Grain Valley, MO (US); Joseph Forrest Noffsinger, Grain Valley, MO (US); Wolfgang Daum, Erie, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 124 days.

(21) Appl. No.: 17/201,105

(22) Filed: Mar. 15, 2021

(65) Prior Publication Data

US 2021/0206408 A1    Jul. 8, 2021

Related U.S. Application Data

(63) Continuation of application No. 16/182,210, filed on Nov. 6, 2018, now Pat. No. 10,967,893, which is a
(Continued)

(51) Int. Cl.
*G06F 17/00* (2019.01)
*B61L 27/30* (2022.01)
(Continued)

(52) U.S. Cl.
CPC ........... *B61L 27/30* (2022.01); *B61L 15/0027* (2013.01); *B61L 15/0036* (2013.01); *B61L 27/70* (2022.01); *H04W 4/42* (2018.02)

(58) Field of Classification Search
CPC .. B61L 3/006; B61L 2205/04; B61L 27/0027; B61L 15/0027; B61L 25/025;
(Continued)

(56) References Cited

U.S. PATENT DOCUMENTS 10,144,440 B2 * 12/2018 Cooper ............... B61L 15/0081
10,967,893 B2 *  4/2021 Cooper ................... B61L 27/70
(Continued)

*Primary Examiner* — Ronnie M Mancho
(74) *Attorney, Agent, or Firm* — The Small Patent Law Group LLC; Josef L. Hoffmann

(57) ABSTRACT

A vehicle communication system includes a wireless communication device and a controller that controls operation of the wireless communication device. The controller directs the wireless communication device to switch between operating in an off-board communication mode and operating in an onboard communication mode. The wireless communication device communicates a remote data signal with an off-board location while the wireless communication device is operating in the off-board communication mode and the wireless communication device communicates a local data signal between vehicles of the vehicle system while the wireless communication device is operating in the onboard communication mode.

20 Claims, 9 Drawing Sheets

Related U.S. Application Data continuation-in-part of application No. 14/193,987, filed on Feb. 28, 2014, now Pat. No. 10,144,440, which is a continuation-in-part of application No. 13/729,446, filed on Dec. 28, 2012, now abandoned, and a continuation-in-part of application No. 12/948,053, filed on Nov. 17, 2010, now abandoned.

(51) Int. Cl.
*B61L 15/00* (2006.01)
*B61L 27/70* (2022.01)
*H04W 4/42* (2018.01)

(58) Field of Classification Search
CPC ............... B61L 15/0081; B61L 25/026; B61L 27/0088; B61L 27/0094; B61L 15/0072; B61L 27/0077; B61L 27/0005; B61L 3/127; B61L 3/125; B61L 2205/00; B61L 25/028; B61L 3/20; B61L 3/227; B61L 15/0018; B61L 17/00; B61L 3/00; B61L 3/16; B61L 27/30; B61L 15/0036; B61L 27/70; B61C 17/12; B60L 2200/26; G05B 13/021; B60T 17/228; B60T 13/665; B60T 7/18; H04W 84/005; H04W 88/06; H04W 28/18; H04W 36/30; H04W 4/42; H04L 67/12; H04L 12/4633; H04L 1/0002; H04L 2012/40293; H04L 61/00; H04L 63/00; H04L 12/4641; H04L 61/2038; H04L 63/0471; G05D 1/00; G05D 1/0011; G05D 1/0027; G05D 1/027; G05D 1/0272; C05D 1/0278; G08G 1/096716; G08G 1/096741; G08G 1/096775; G08G 1/127; G08G 1/20; B60W 50/04; G07C 5/008; G06Q 50/30
USPC .............................................................. 701/2
See application file for complete search history.

(56) References Cited

U.S. PATENT DOCUMENTS

| | | | |
|---|---|---|---|
| 2019/0071107 A1* | 3/2019 | Cooper | ................... B61L 27/70 |
| 2021/0206408 A1* | 7/2021 | Cooper | ................... B61L 27/30 |

* cited by examiner

VEHICLE DATA COMMUNICATION SYSTEM

CROSS-REFERENCE TO RELATED APPLICATIONS

This application is a continuation of U.S. patent application Ser. No. 16/182,210 (filed 6 Nov. 2018), which is a continuation-in-part of U.S. patent application Ser. No. 14/193,987 (filed 28 Feb. 2014, now U.S. Pat. No. 10,144,440), which is (a) a continuation-in-part of U.S. patent application Ser. No. 12/948,053 (filed 17 Nov. 2010) and (b) a continuation-in-part of U.S. patent application Ser. No. 13/729,446 (filed on 28-Dec.-2012). The entire disclosures of these applications are incorporated herein by reference.

BACKGROUND

Technical Field

The present disclosure is directed to methods and systems for controlling vehicle data communications.

DISCUSSION OF ART

A set of vehicles under multiple-unit (MU) control, such as a consist of rail vehicles, includes a plurality of vehicles for providing power to propel the consist that are controlled from a single location. Typically, the vehicles are spread throughout the consist to provide increased efficiency and greater operational flexibility. In one example configuration, control data generated at a lead control vehicle is sent through a dedicated, narrow-band radio link to the other, remote vehicles, to control operation of the consist from a single location.

Under some conditions, however, radio transmissions between the lead vehicle and the remote vehicles are lost or degraded. For example, on some terrain, long consist configurations lose direct line-of-site between remote vehicles, and radio transmission signals do not properly reflect off the surrounding terrain to reach the remote vehicles, resulting in a loss of data communication. Such periods of lost data communication result in reduced performance capability, increased fuel consumption, and an overall reduction in reliability of operation of the consist.

The local communications between vehicles in the vehicle consist may include various signals containing messages relating to a wide range of information, including operation, safety, status, and confirmations, among a host of others. The potentially large number of local communications transmitted between vehicles can congest the available bandwidth used to transmit the signals. Signals may get lost in the transmission, resulting in non-receipt of the contained message. Additionally, some vehicle systems may be configured upon non-receipt of certain communications to automatically shut down for safety reasons so that any potential problems with the vehicle system may be discovered. A shut-down caused by non-receipt of a local signal could result in a long delay before the vehicle system resumes its route.

BRIEF DESCRIPTION

In one embodiment, a communication system includes a wireless communication device configured to be disposed onboard a vehicle system having propulsion-generating vehicles and a controller configured to be disposed onboard the vehicle system and operatively connected with the wireless communication device to control operation of the wireless communication device. The controller is configured to direct the wireless communication device to switch between operating in an off-board communication mode and operating in an onboard communication mode. The wireless communication device is configured to communicate a remote data signal with an off-board location while the wireless communication device is operating in the off-board communication mode and the wireless communication device is configured to communicate a local data signal between the propulsion-generating vehicles of the vehicle system while the wireless communication device is operating in the onboard communication mode.

In one embodiment, a method includes directing a wireless communication device disposed onboard a vehicle system to operate in an off-board communication mode. The vehicle system has two or more propulsion-generating vehicles. The wireless communication device is configured to receive a remote data signals from an off-board location while in the off-board communication mode. The method also includes switching the wireless communication device from operating in the off-board communication mode to operating in an onboard communication mode. The wireless communication device communicates a local data signal between the propulsion-generating vehicles of the vehicle system while in the onboard communication mode. The method also includes controlling movement of the vehicle system responsive to receipt of one or more of the remote data signal or the local data signal.

In one embodiment, a vehicle communication system includes a controller configured to be disposed onboard a vehicle system having two or more propulsion-generating vehicles. The controller is configured to operatively connect with the propulsion-generating vehicles and a wireless communication device. The controller is configured to direct the wireless communication device to switch between operating in an off-board communication mode and operating in an onboard communication mode. In the off-board communication mode, the wireless communication device is configured to receive remote data signals from a location that is disposed off-board of the vehicle system. In the onboard communication mode, the wireless communication device is configured to communicate local data signals between the propulsion-generating vehicles of the vehicle system.

BRIEF DESCRIPTION OF THE DRAWINGS

The present invention will be better understood from reading the following description of non-limiting embodiments, with reference to the attached drawings, wherein below.

DETAILED DESCRIPTION

The present disclosure is directed to systems and methods for data communications between remote rail vehicles of a multiple-unit rail vehicle configuration. More particularly, the present disclosure is directed to systems and methods for providing data communications through different data paths based on operating conditions. For example, in a multiple-unit rail vehicle configuration where a lead control rail vehicle remotely controls operation of the other rail vehicles, data communications are sent from the lead control rail vehicle directly to the other rail vehicles through a dedicated, narrow-band radio link, or the data communications are sent relayed through a wireless network provided by a wayside device to the remote rail vehicles based on operating conditions. In one example, data communications are relayed through the wireless network provided by the wayside device in response to not receiving a confirmation from a remote rail vehicle of receiving a data communication sent through the radio link. In another example, when the rail vehicle is in range to recognize the wireless network provided by the wayside device, data communications are relayed through the wireless network, and when the rail vehicle does not recognize the wireless network, the same data communications are sent through a different data communication path (e.g., data radio). By directing data communications through different data communication paths based on operating conditions, the same data can be sent through different communication paths and the remote rail vehicles in a multiple-unit rail vehicle configuration can remain in communication even as operating conditions vary. Accordingly, data communication between remote rail vehicles is made more reliable.

Figure 1:
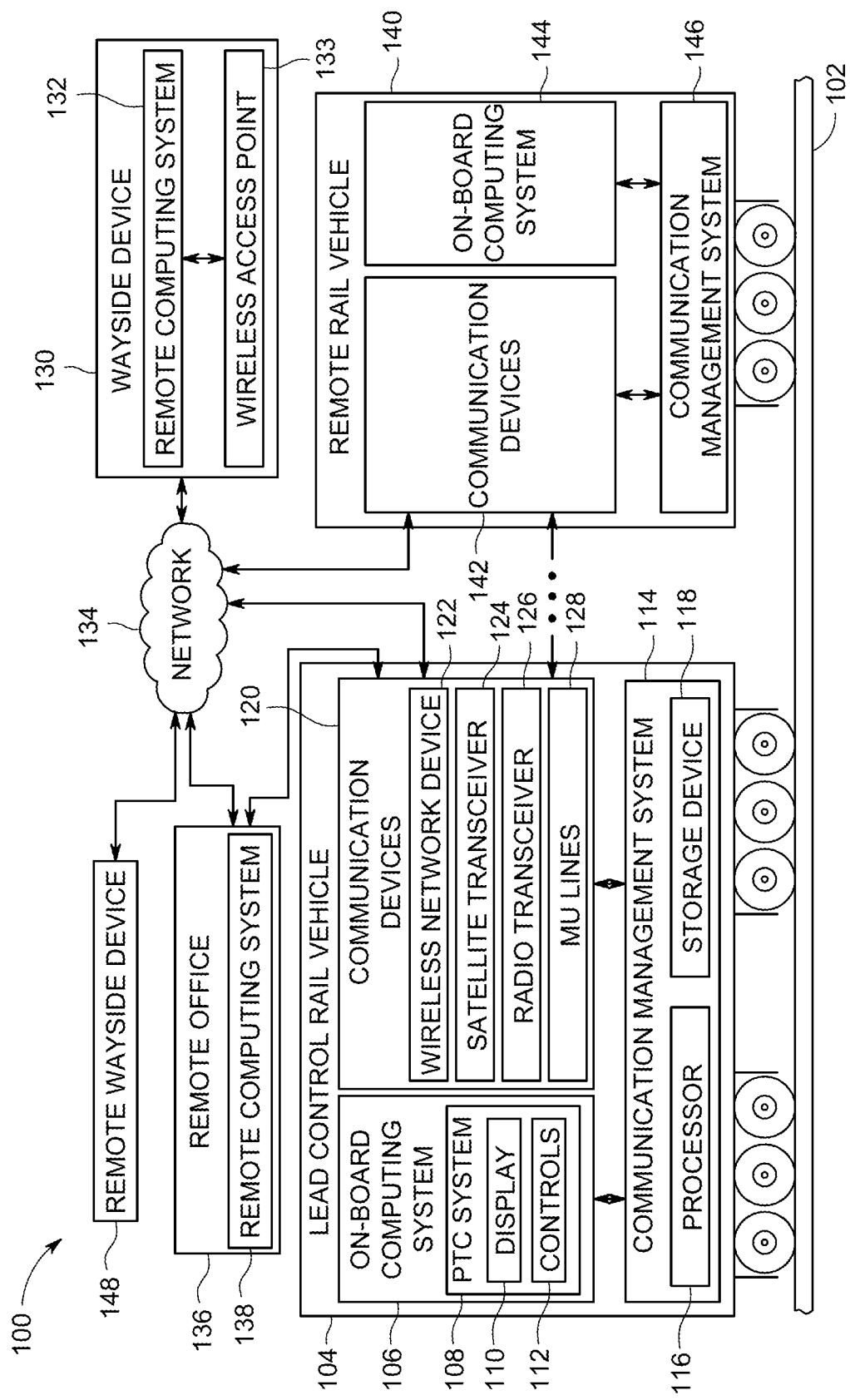
FIG. 1 is schematic diagram of an example embodiment of a vehicle system of the present disclosure.

FIG. 1 is a schematic diagram of an example embodiment of a vehicle system, herein depicted as a rail vehicle system 100, configured to travel on a route 102, such as a rail or track. The rail vehicle system 100 is a multiple-unit rail vehicle system including a plurality of rail vehicles, herein depicted as a lead control rail vehicle 104 and a remote rail vehicle 140. The lead control rail vehicle 104 and the remote rail vehicle 140 represent rail vehicles that provide tractive effort to propel the rail vehicle system 100. For example, the vehicles 104, 140 may be locomotives. In one example, the plurality of rail vehicles are diesel-electric vehicles that each include a diesel engine (not shown) that generates a torque output that is converted to electricity by an alternator (not shown) for subsequent propagation to a variety of downstream electrical components, such as a plurality of traction motors (not shown) to provide tractive power to propel the rail vehicle system 100.

Alternatively, the vehicle system may include another type of vehicle. For example, the vehicle(s) forming the vehicle system may be automobiles, trucks, mining vehicles, or another type of vehicle. While the description herein focuses on the vehicle system being formed from vehicles that are mechanically coupled with each other, alternatively, the vehicle system can be formed of vehicles that travel together along routes, but that are not mechanically coupled with each other. For example, the vehicles may be mechanically de-coupled or separate from each other but may be logically coupled with each other. Vehicles can be logically coupled with each other when the vehicles communicate with each other to coordinate their movements so that the vehicles move together (e.g., in a platoon).

Although only two rail vehicles are depicted, it will be appreciated that the rail vehicle system may include more than two rail vehicles. Furthermore, the rail vehicle system 100 may include rolling stock that does not provide power to propel the rail vehicle system 100. For example, the lead control rail vehicle 104 and the remote rail vehicle 140 may be separated by a plurality of units (e.g., passenger or freight cars) that do not provide propulsion. On the other hand, every unit in the multiple-unit rail vehicle system may include propulsive system components that are controllable from a single location. The rail vehicles 104, 140 are physically linked to travel together along the rail 102.

In the illustrated embodiment, the lead control rail vehicle 104 includes an on-board computing system 106 to control operation of the rail vehicle system 100. In particular, the on-board computing system 106 controls operation of a propulsion system (not shown) on-board the lead control rail vehicle 104 as well as provides control commands for other rail vehicles in the rail vehicle system, such as the remote rail vehicle 140. The on-board computing system 106 is operatively coupled with a communication management system 114 that, in turn, is operatively coupled with a plurality of communication devices 120. When the on-board computing system 106 generates data communications (e.g., control commands), the communication management system 114 determines which communication path (or device) to use for sending the data communications to the remote rail vehicle 140.

In an embodiment, the on-board computing system 106 includes a positive train control (PTC) system 108 that includes a display 110, and operational controls 112. The PTC system 108 is positioned in a cabin of the lead control rail vehicle 104 to monitor the location and movement of the rail vehicle system 100. For example, the PTC system 108 enforces travel restrictions including movement authorities that prevent unwarranted movement of the rail vehicle system 100. Based on travel information generated by the rail vehicle system 100 and/or received through the plurality of communication devices 120, the PTC system 108 determines the location of the rail vehicle system 100 and how fast it can travel based on the travel restrictions and determines if movement enforcement is performed to adjust the speed of the rail vehicle 100. The travel information includes features of the railroad track (rail 102), such as geometry, grade, etc. Also, the travel information includes travel restriction information, such as movement authorities and speed limits, which can be travel zone or track dependent. The travel restriction information can consider rail vehicle system state information such as length, weight, height, etc. In this way, rail vehicle collisions, over speed derailments, incursions into work zones, and/or travel through an improperly positioned switch can be reduced or prevented. As an example, the PTC system 108 provides commands to the propulsion systems of the lead control rail vehicle 104 as well as to the other rail vehicles, such as the remote rail vehicle 140, to slow or stop the rail vehicle system 100 to comply with a speed restriction or a movement authority.

In one example, the PTC system 108 determines location and movement authority of the rail vehicle system 100 based on travel information that is organized into a database (not shown) that is stored in a storage device of the PTC system 108. In one example, the database houses travel information that is updated by the remote office 136 and/or the wayside device 130 and is received by the communication management system 114 through one or more of the plurality of communication devices 120. In one example, travel information is received over a wireless network 134 provided by a wireless access point 133 of the wayside device 130 through a wireless network device 122. In one example, the rail vehicle location information is determined from GPS information received through a satellite transceiver 124. In one example, the rail vehicle location information is determined from travel information received through a radio transceiver 126. In one example, the rail vehicle location information is determined from sensors, such as beginning of rail vehicle location and end of rail vehicle location sensors that are received through the radio transceiver 126 and/or multiple-unit lines 128 from other remote rail vehicles, such as the remote rail vehicle 140 of the rail vehicle system 100.

The display 110 presents rail vehicle state information and travel information to an operator in the cabin of the lead control rail vehicle 104. In one example, the display 110 presents a rolling map that provides an indication of the location of the rail vehicle system 100 to the operator. For example, the rolling map includes a beginning of rail vehicle location, an end of rail vehicle location, rail vehicle length, rail road track zone, mile post markers, wayside device location, GPS location, etc. Furthermore, the rolling map is annotated with movement authority regulations and speed restrictions.

The operational controls 112 enable the operator to provide control commands to control operation of the rail vehicle system 100. In one example, the operational controls 112 include buttons, switches, and the like that are physically actuated to provide input. In one example, the operational controls 112 include a touch sensitive display that senses touch input by the operator. For example, the operational controls 112 include a speed control that initiates the sending of control commands to propulsion systems of the different rail vehicles of the rail vehicle system 100. In one example, the speed control includes a throttle input, a brake input, and a reverse input. In one example, the operational controls 112 include an automated control feature that automatically determines control commands based on travel information received by the PTC system 108 to automatically control operation of the rail vehicle system 100.

The communication management system 114 determines which data communication path to use for sending and receiving data communications between remote rail vehicles of the rail vehicle system 100 based on operating conditions. For example, operating conditions may include availability of a data communications path. If a plurality of data communications paths is available, operating conditions may include prioritization criteria for selecting a data communications path. Non-limiting examples of prioritization criteria include a lowest cost data communications path that is available, a highest reliability data communications path that is available, a highest bandwidth data communications path that is available, etc. The plurality of communications paths provide redundancy that enables the same data to be sent through different data paths to enable data communication between vehicles even as operating conditions vary.

Furthermore, the communication management system 114 manages operation of resources distributed throughout the rail vehicle system 100 and/or resources off-board the rail vehicle system 100 to meet an operational load of the rail vehicle system 100. In one example, the operational load includes processing tasks that are assigned to different computing systems of the rail vehicle system 100, the wayside device 130, and/or the remote office 136. In particular, the communication management system 114 determines which processors are available and assigns processing tasks to available processors to meet the operational load of the rail vehicle system 100. Non-limiting examples of processing tasks include determining location, determining braking distance, determining optimum speed, etc. In cases where processing tasks are performed off-board the rail vehicle system 100, such as at a remote computing system 132 of the wayside device 130, data communications are sent from the lead control rail vehicle 104 (or another rail vehicle) to the wireless network 134 through the wireless network device 122. The remote computing system 132 performs the processing task and the results are sent back to the lead control rail vehicle 104 on the wireless network 134.

In another example, operational load includes a propulsive load that is to be generated by the rail vehicle system 100 to meet a desired speed. In particular, the communication management system 114 determines the propulsive capability of available rail vehicles and relays propulsion system control commands to on-board computers on selected rail vehicles through the wireless network 134 provided by the wayside device 130 to the selected rail vehicles to collectively generate enough tractive power to meet the desired speed. If the speed is lower than the collective capability of the plurality of rail vehicles of the rail vehicle system 100, then control commands are relayed to some selected rail vehicle while others remain dormant. As the operational load varies, the control commands can be sent to the dormant rail vehicles to provide additional capability.

Furthermore, the communication management system 114 switches operational control of the rail vehicle system 100 between on-board computers of different rail vehicles of the rail vehicle system 100 based on operating conditions. In one example, in response to degradation of the on-board computing system 106 on the lead control rail vehicle 104 (the on-board computing system 106 thereby being a degraded computing system), the communication management system 114 commands initialization of an on-board computing system on a different rail vehicle, such as remote rail vehicle 140, to take control of operation of the rail vehicle system 100

The communication management system 114 includes hardware circuitry that includes and/or is connected with one or more processors 116 and a non-transitive storage device 118 that holds instructions that when executed perform operations to control the communication management system 114. For example, the storage device 118 includes instructions that when executed by processor 116 perform methods described in further detail below with reference to FIGS. 2 through 6.

As discussed above, the rail vehicle system 100 is equipped with a plurality of different communication devices 120 that form different data communication paths between rail vehicles of the rail vehicle system 100 as well as data communication paths off-board the rail vehicle system 100 such as with the wayside device 130 and/or the remote office 136. The communication management system 114 determines which communication device to use for data communications based on operating conditions. The plurality of communications devices 120 can include a wireless network device 122, a satellite transceiver 124, a radio transceiver 126, and multiple-unit lines 128.

The wireless network device 122 dynamically establishes a wireless communication session with a wireless network, such as the wireless network 134 provided by the wireless access point 133 of the wayside device 130, to send and receive data communications between different rail vehicles of the rail vehicle system 100. As the rail vehicle system 100 travels through different travel zones, the wireless network device 122 detects different wireless network access points provided by wayside devices or other communication devices along the railroad track (rail 102). In one example, a single wireless network covers a travel territory, and different wayside devices provide access points to the wireless network. Non-limiting examples of protocols that the wireless network device 122 follows to connect to the wireless network 134 include IEEE 802:11, Wi-Max, Wi-Fi, etc. In one example, the wireless network communications operate around the 220 MHz frequency band. The wireless network device 122 generates a unique identifier that indicates the rail vehicle system 100. The unique identifier is employed in data communication messages of rail vehicles in the rail vehicle system 100 so that wireless network devices on rail vehicles of the same rail vehicle system appropriately identify and receive message intended for them. By relaying intra-train data communications through the wireless network 134, data communication is made more reliable, especially in conditions where direct radio communication can be lost.

The satellite transceiver 124 sends and receives data communications that are relayed through a satellite. In one example, the satellite transceiver 124 communicates with the remote office 136 to send and receive data communications including travel information and the like. In one example, the satellite transceiver 124 receives rail vehicle system location information from a third-party global position system to determine the location of the rail vehicle system. In one example, the communication management system 114 assigns processing tasks to a remote computing system 138 at the remote office 136 and the data communications are sent and received through the satellite transceiver 124.

The radio transceiver 126 provides a direct radio frequency (RF) data communications link between rail vehicles of the rail vehicle system 100. For example, the radio transceiver 126 of the lead control rail vehicle 104 sends a data communication that is received by a radio transceiver on the remote rail vehicle 140. In one example, the rail vehicle system 100 may include repeaters to retransmit direct RF data communications between radio transceivers. In one example, the radio transceiver 126 includes a cellular radio transceiver to enable data communications, through a third-party, to remote sources, such as the remote office 136.

In some embodiments, the radio transceiver 126 includes a cellular radio transceiver (e.g., cellular telephone module) that enables a cellular communication path. In one example, the cellular radio transceiver communicates with cellular telephony towers located proximate to the track. For example, the cellular transceiver enables data communications between the rail vehicle system 100 and the remote office 136 through a third-party cellular provider. In one embodiment, each of two or more rail vehicles in the system (e.g., consist) has a respective cellular radio transceiver for communications with other rail vehicles in the system through the third-party cellular provider.

The multiple-unit (MU) lines 128 provide wired power connections between rail vehicles of the rail vehicle system 100. In one example, the multiple-unit lines 128 include 27 pin cables that connect between each of the rail vehicles. The multiple-unit lines 128 supply 74 Volt direct current (DC), 1 Amp power to the rail vehicles. As another example, the multiple-unit lines supply 110 Volt DC power to the rail vehicles. The power signal sent through the multiple-unit lines 128 is modulated to provide additional data communications capability. In one example, the power signal is modulated to generate a 10 M/second information pipeline. Non-limiting examples of data communications passed through the multiple-unit lines 128 includes travel information, rail vehicle state information and rail vehicle control commands, such as reverse, forward, wheel slip indication, engine run, dynamic brake control, etc.

It will be appreciated that one or more of the plurality of communication devices discussed above may be omitted from the rail vehicle system 100 without departing from the scope of the present disclosure.

The wayside device 130 may embody different devices located along a route 102, such as a railroad track or rail. Non-limiting examples of wayside devices include signaling devices, switching devices, communication devices, etc. The wayside device 130 includes the remote computing system 132. In one example, the remote computing system 132 provides travel information to the rail vehicle system 100. In one example, the remote computing system 132 is assigned a processing task by the communication management system 114 if available on-board processing capabilities of the rail vehicle system do not meet the operational load of the rail vehicle system 100. The wayside device 130 includes the wireless access point 133 which allows the wireless network device 122 as well as wireless network devices on other rail vehicles in range to connect to the wireless network 134. The communication management system 114 on-board rail vehicles of the rail vehicle system 100 dynamically establish network sessions with the wireless network 134 through the wireless network device 122 to relay data communication between rail vehicles of the rail vehicle system 100.

In some embodiments, under some conditions, information and/or operations are transferred between wayside devices by relaying communication over the network and through the rail vehicle system. For example, data communications are sent from the wayside device 130, through the network 134, to the wireless network device 122, and the data communications are relayed by the wireless network device 122 to a remote wayside device 148 that is in data communication range. In some cases, the rail vehicle system extends the data communication range of the wayside devices due to the length of the consist. In some cases, the wayside device 130 sends data communications through the network 134 to the remote wayside device 148 without relaying the data communications through the wireless network device 122. In one example, two wayside devices are configured to perform similar or equivalent operations, and in response to degradation of one of the wayside devices, the functionality of the degraded wayside device is transferred to the other wayside device, by sending data communications over the wireless network and relayed through the wireless network device of the rail vehicle system.

For example, two signaling light processing units are positioned within communication range of the rail vehicle system, upon degradation of one of the signaling light processing units, processing operations for the degraded signal light processing unit are transferred over the wireless network to the functioning signaling light processing unit to carry out the processing operations in order to maintain operation of the signaling light having the degraded processing unit.

Furthermore, in some cases, functionality or processing operations are transferred from a wayside device to the rail vehicle system. For example, the remote computing system 132 of the wayside device 130 is configured to calculate a braking curve for a section of track. Upon degradation of the remote computing system 132, the wayside device 130 transfers, through the wireless network 134, the brake curve calculation to the on-board computing system 106. Accordingly, the on-board computing system 106 calculates the brake curve to maintain functionality that would otherwise be lost due to degradation of the remote computing system 132. As another example, a switch is configured to calculate a setting or block occupancy. Upon degradation of the switch, the setting or block occupancy calculation is transferred, through the wireless network 134, to the on-board computing system 106. By relaying data communications between remote wayside devices through a rail vehicle, processing operation can be transferred between different wayside devices. Moreover, by establishing a wireless network session between a wayside device and a rail vehicle system, wayside device processing operations can be transferred from a wayside device to processing resources of a rail vehicle system. Accordingly, data communications and processing operations is made more robust since functionality is maintained even upon degradation of a rail vehicle or wayside device component.

The remote office 136 includes the remote computing system 138. In one example, the remote computing system 138 provides travel information to the rail vehicle system 100, such as a travel database that is downloaded to the on-board computing system 106. In one example, the remote office 136 communicates directly with the rail vehicle system 100 (e.g., through satellite transceiver 124). In one example, the remote office 136 relays data communications through the wireless network 134 of the wayside device 130 to the rail vehicle system 100. In one example, the remote computing system 138 is assigned a processing task by the communication management system 114 if available on-board processing capabilities of the rail vehicle system do not meet the operational load of the rail vehicle system 100.

In some embodiments, the components in the lead control rail vehicle 104 are replicated in each rail vehicle in the rail vehicle system 100. For example, the remote rail vehicle 140 includes an on-board computing system 144 that is operatively coupled with a communication management system 146 that, in turn, is operatively coupled with a plurality of communication devices 142. For example, the plurality of communication devices includes a wireless network device, a satellite transceiver, a radio transceiver and multiple-unit lines. These components provide equivalent functionality and capability as the instances on the lead control rail vehicle 104. By replicating the components on each rail vehicle, each rail vehicle can communicate and/or controlling the other rail vehicles in the rail vehicle system 100. Accordingly, operation of the rail vehicle system 100 is made more flexible and reliable. Note in some embodiments, one or more of the communication devices may be omitted from a rail vehicle without departing from the scope of the present disclosure.

Figure 2:
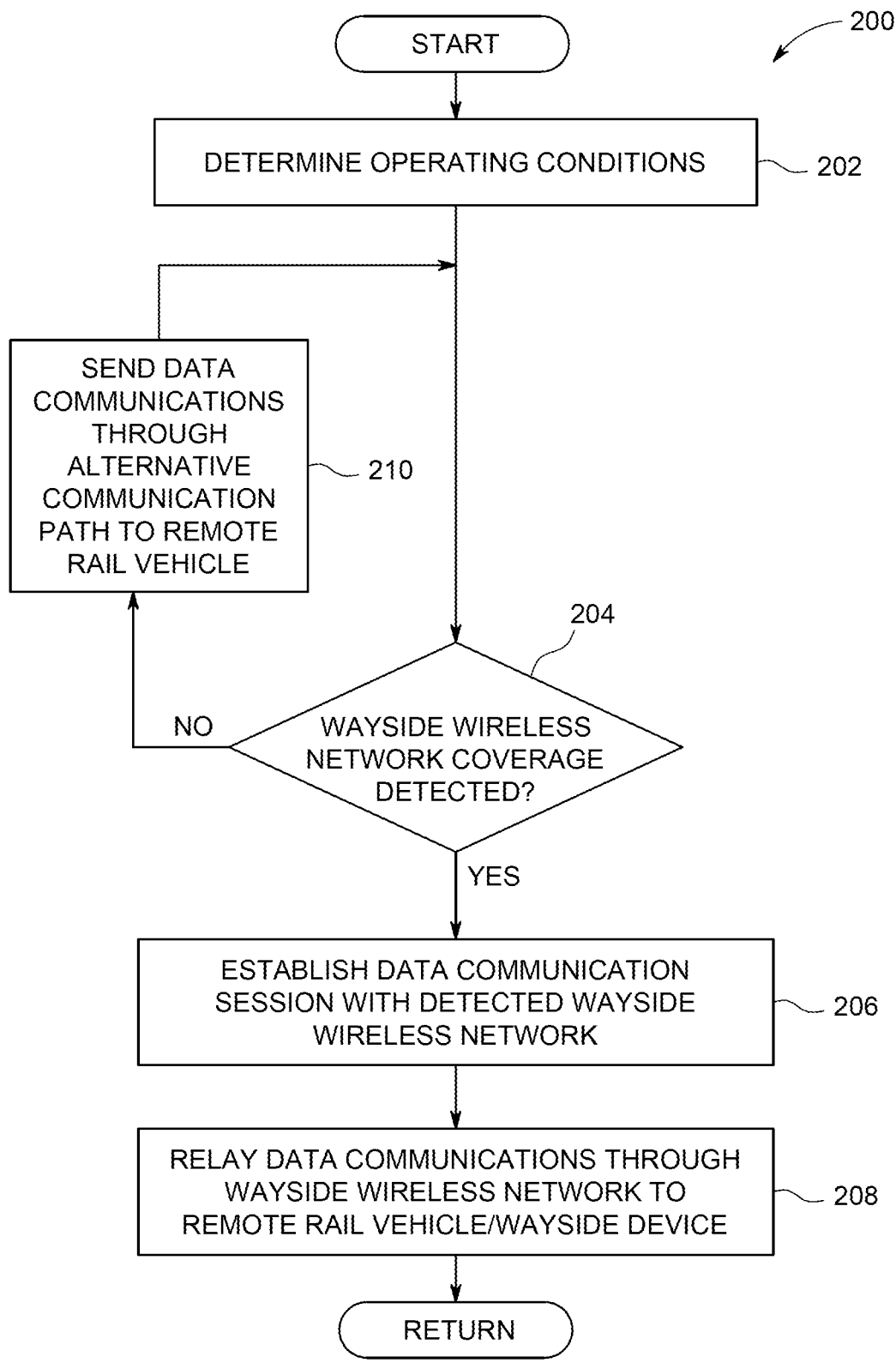
FIG. 2 is a flow diagram of an example embodiment of a method for relaying data communications through a wayside wireless network between remote vehicles of a multi-vehicle system.

FIG. 2 is a flow diagram of an example embodiment of a method 200 for relaying data communications through a wayside wireless network between remote rail vehicles of a multiple-unit rail vehicle system. In one example, the method 200 is performed by the communication management system 114 of the rail vehicle system 100 depicted in FIG. 1.

At 202, the method includes determining operating conditions. Determining operating conditions includes determining whether an on-board computing system is functioning properly and whether the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 204, the method includes determining if the rail vehicle system is in a coverage range of a wireless network provided by a wayside device. In one example, the wireless network device 122 detects wireless network coverage by receiving wireless network signals from a wayside device. If it is determined that wireless network coverage is detected, the method moves to 206. Otherwise, the method moves to 210.

At 206, the method includes dynamically establishing a data communication session with the detected wayside wireless network. In one example, establishing the data communication session includes assigning a unique address to the rail vehicle system, so that rail vehicles in the rail vehicle system can identify messages intended for the rail vehicles as opposed to message intended for another rail vehicle system. The unique address may include a symbol for the rail vehicle system or unique attribute of rail vehicle system.

At 208, the method includes relaying data communications through the wayside wireless network to a remote rail vehicle of the rail vehicle system and/or a remote wayside device. In one example, the communication management system 114 sends data communications through the wireless network device 122 to the wireless access point 133. Subsequently, the data communications are relayed over the wireless network 134 to a wireless network device of a remote rail vehicle. For example, the wireless access point 133 sends the data communications to the wireless network device of the remote rail vehicle. In one example, the data communications include control commands to remotely control operation of the remote rail vehicle. In one example, data communications are sent from the wayside device 130, over the wireless network 134 and relayed through the wireless network device 122, to the remote wayside device 148.

At 210, the method includes sending data communication through an alternative communication path to the remote rail vehicle. Since there is insufficient wireless network coverage, the communication management system 114 selects a different communication device to send the data communications to the remote rail vehicle. Insufficient network coverage includes little or no network coverage that would make data communication through the wireless network less reliable. In one example, the communication management system 114 sends data communication through the radio transceiver 126 to the remote rail vehicle. In one example, the communication management system 114 sends data communications through the multiple-unit lines 128 to the remote rail vehicle. Note the same data is sent through the different communication paths to enable data communication between rail vehicles of the rail vehicle system 100.

The above described method enables intra-train data communications to be sent from one rail vehicle in a multiple-unit rail vehicle system (e.g., consist), relayed through a wayside wireless network, and received by a remote rail vehicle of the multiple-unit rail vehicle system. By relaying intra-train data communications through the wayside wireless network when network coverage is available, the reliability of data communications can be improved by the established data communications session. Moreover, the above-described method enables flexible operation by sending data communications through another communication path when wireless network coverage is not available.

Figure 3:
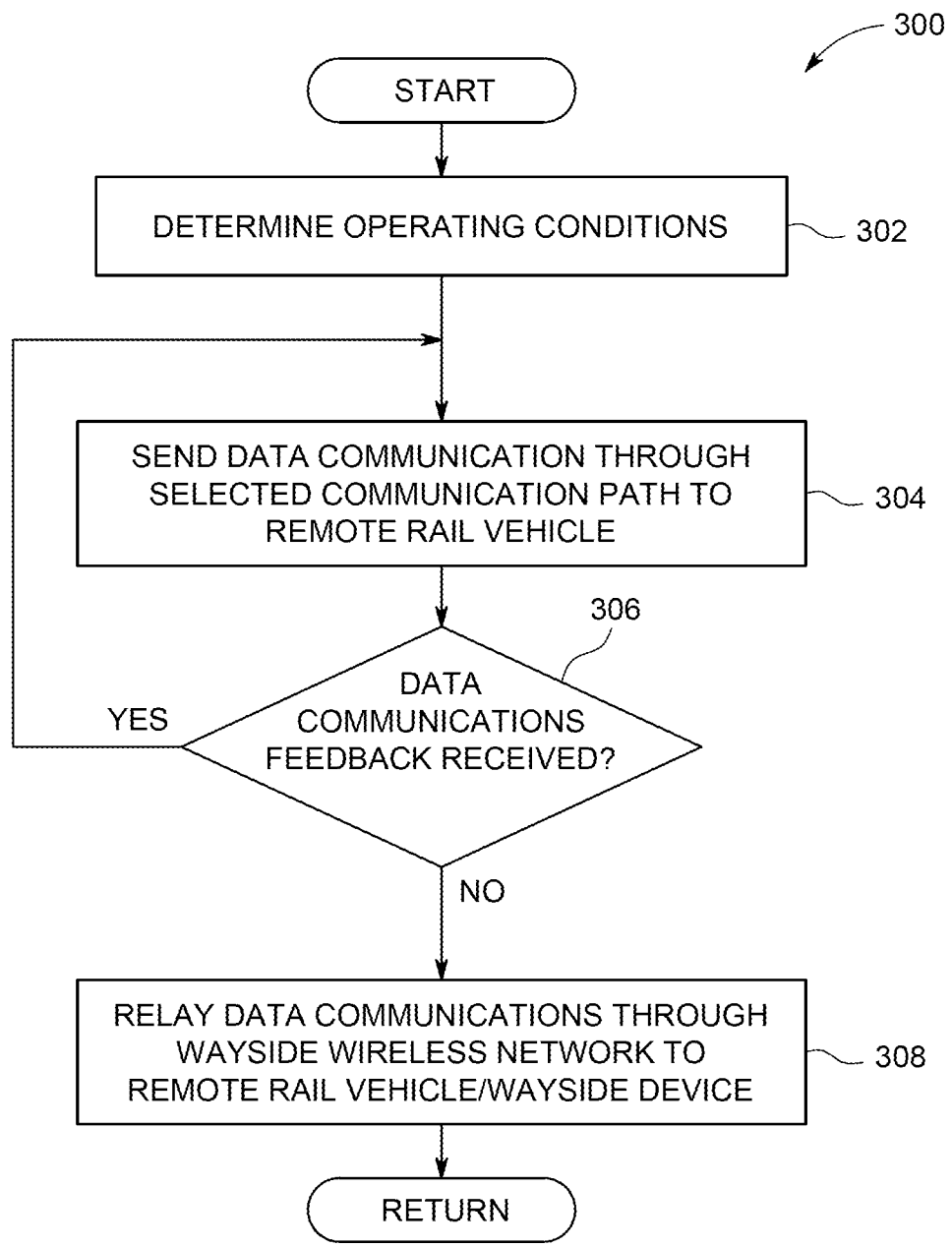
FIG. 3 is a flow diagram of an example embodiment of a method for relaying data communications through a wayside wireless network between remote vehicles of a multi-vehicle system in response to a loss of data communications.

FIG. 3 is a flow diagram of an example embodiment of a method 300 for relaying data communications through a wayside wireless network between remote rail vehicles of a multiple-unit rail vehicle system in response to a loss in data communications through an alternative data path. In one example, the method 300 is performed by the communication management system 114 of the rail vehicle system 100 depicted in FIG. 1.

At 302, the method includes determining operating conditions. Determining operating conditions includes determining whether an on-board computing system is functioning properly and whether the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 304, the method includes sending data communications through a selected communication path to a remote rail vehicle in the multiple-unit rail vehicle system. In one example, the selected data communication path includes a direct RF link to the remote rail vehicle, where data communications are sent through the radio transceiver 126.

At 306, the method includes determining if data communications feedback is received. In one example, data communications feedback includes a confirmation received from the remote rail vehicle indicating that the remote rail vehicle received the data communications. In one example, where the data communications include control commands, the data communications feedback includes an adjustment in operation of the remote rail vehicle. If it is determined that data communication feedback is received, the method moves returns to 304. Otherwise, the method moves to 308.

In one example, data communications are sent through a direct RF link between remote rail vehicles. However, various conditions may cause a loss of data communications. For example, a rail vehicle system configuration, such as a very long consist where there is a large distance between rail vehicles, may cause a loss of data communications through the direct RF link. As another example, geography, such as terrain that does not reflect a radio signal to a remote vehicle, may cause a loss of data communications through the direct RF link.

At 308, the method includes relaying data communications through the wayside wireless network to a remote rail vehicle of the rail vehicle system and/or a remote wayside device. The same data is relayed through the wayside wireless network in response to a loss of data communications by an alternative data communications path. In one example, the communication management system 114 sends data communications to the wireless network 134 through the wireless network device 122. Subsequently, the wireless network 134 relays the data communications to a wireless network device of a remote rail vehicle. In one example, the data communications include control commands to remotely control operation of the remote rail vehicle. In one example, data communications are sent from the wayside device 130, over the wireless network 134 and relayed through the wireless network device 122, to the remote wayside device 148.

By relaying data communications through a wayside wireless network in response to a loss of data communications by an alternative data communications path (e.g., a direct RF link), intra-train data communication can be achieved between remote rail vehicles even when operating conditions prevent communication by the alternate communications path. Accordingly, intra-train data communications and remote control of rail vehicles in a multi-unit rail vehicle system is made more robust and reliable as operating conditions vary.

Figure 4:
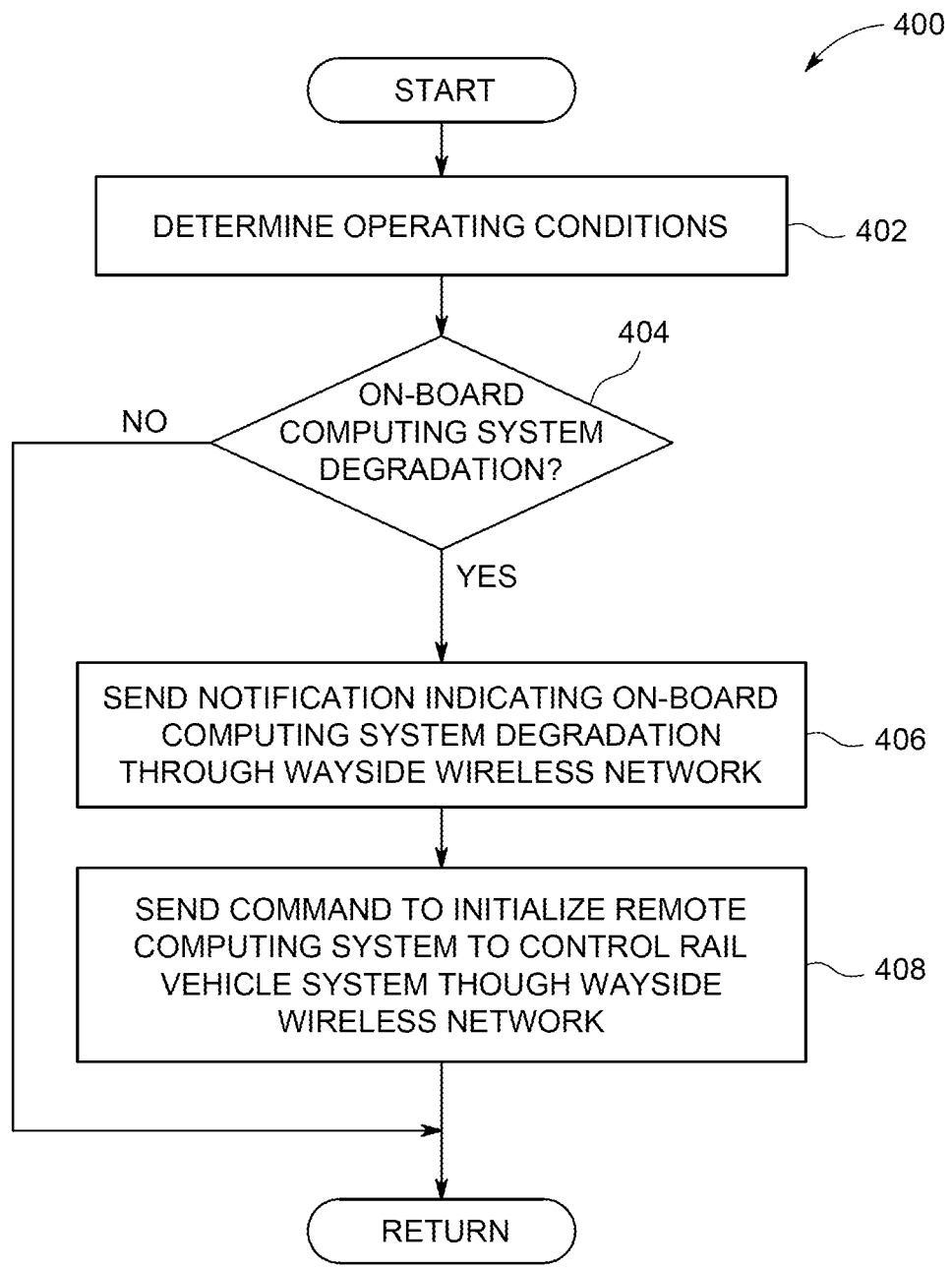
FIG. 4 is a flow diagram of an example embodiment of a method for transferring control to a vehicle of a multi-vehicle system through a wayside wireless network.

FIG. 4 is a flow diagram of an example embodiment of a method 400 for transferring control to a rail vehicle of a multiple-unit rail vehicle system through a wayside wireless network. In one example, the method 400 is performed by the communication management system 114 of the rail vehicle system 100 depicted in FIG. 1.

At 402, the method includes determining operating conditions. Determining operating conditions includes determining whether an on-board computing system is functioning properly and whether the on-board computing system is controlling operation of remote rail vehicles of the rail vehicle system. Determining operating conditions includes determining an availability of data communication paths for the rail vehicle system. Determining operating conditions includes receiving rail vehicle state and location information.

At 404, the method includes determining if the on-board computing system is degraded. In one example, the degradation determination is made responsive to setting of a localized flag indicating a component of the on-board computing system is not functioning properly. In one example, the degradation determination is made based on unresponsiveness to control adjustment made manually or automatically. If it is determined that the on-board computing system is degraded, the method moves to 406. Otherwise, the method returns to other operations.

At 406, the method includes sending a notification, through the wayside wireless network, indicating degradation of the on-board computing system. In some cases, the notification is relayed to other remote rail vehicles of the rail vehicle system. In some cases, the notification is relayed to a remote office. In one example, the notification includes a signal commanding an alarm to sound to notify an operator locally or remotely.

At 408, the method includes sending a command, through the wayside wireless network, to initialize a remote computing system to control the rail vehicle system. In one example, the initialization command is sent to a remote computing system located off-board the rail vehicle system, such as at a remote office to control the rail vehicle system remotely. In one example, the initialization command is sent to another on-board computing device located in a different rail vehicle of the rail vehicle system. Since each rail vehicle is equipped with the same or a similar set of components, control of the rail vehicle system can be transferred from an on-board computing system on one rail vehicle to an on-board computing system on another rail vehicle.

By transferring operational control from an on-board computing system to a remote computing system through the wayside wireless network based on degradation of the on-board computing system, operation control of the rail vehicle system can be maintained even when a controlling on-board computing system becomes degraded. In this way, the rail vehicle is made more robust.

Figure 5:
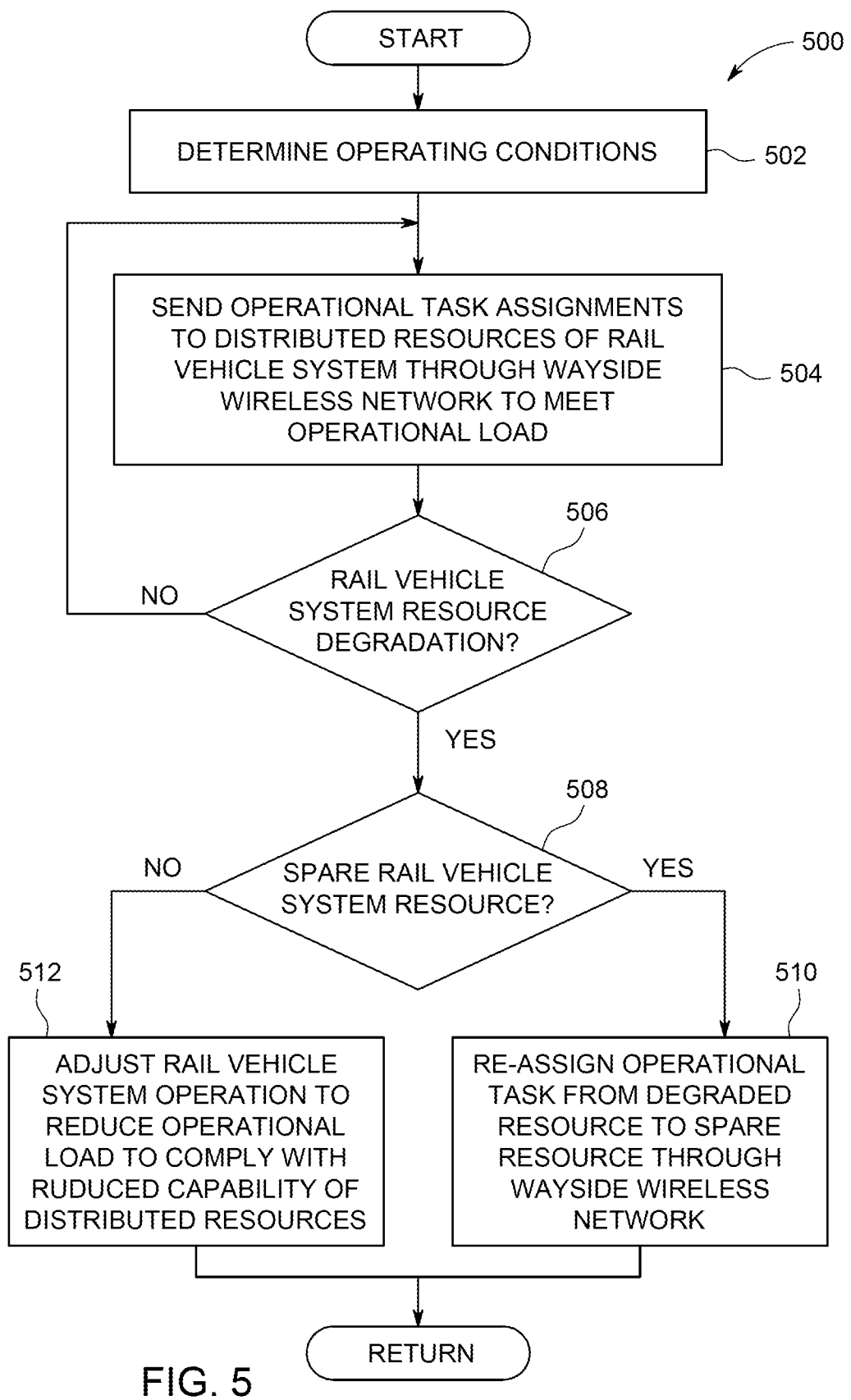
FIG. 5 is a flow diagram of an example embodiment of a method for distributing operating tasks to different remote resources of a multi-vehicle system through a wayside wireless network responsive to resource degradation.

FIG. 5 is a flow diagram of an example embodiment of a method 500 for distributing operational tasks to different resources of a multiple-unit rail vehicle system through a wayside wireless network responsive to resource degradation. In one example, the method 500 is performed by the communication management system 114 of the rail vehicle system 100 depicted in FIG. 1. In another example, the method 400 is performed by the remote computing system 132 of the wayside device 130 depicted in FIG. 1.

At 502, the method includes determining operating conditions. Determining operating conditions includes determining whether an on-board computing system or a remote computing system of the rail vehicle system is functioning properly. Determining operating conditions includes determining an availability of data communication paths for the rail vehicle system. Determining operating conditions includes receiving rail vehicle state and location information. Determining operating conditions includes determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 504, the method includes sending, through the wayside wireless network, operational task assignments to distributed resources of the rail vehicle system to meet an operational load. In cases where the operational load is a processing load, processing tasks are assigned to available processing resources of different remote computing systems. In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle for the rail vehicle system to meet the desired travel speed.

At 506, the method includes determining if a rail vehicle system or wayside device resource is degraded. In one example, the rail vehicle or wayside device resource includes a processing resource of a computing system the can become degraded or unavailable. In one example, the rail vehicle resource includes a propulsive/brake resource, such as a traction motor or an air brake. If it is determined that the rail vehicle system resource is degraded, the method moves to 508. Otherwise, the method returns to 504.

At 508, the method includes determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method moves to 510. Otherwise, the method moves to 512.

At 510, the method includes re-assigning, through the wayside wireless network, the operational task from the degraded rail vehicle system resource to the spare rail vehicle system resource. In one example where the operational task is a processing task, re-assigning includes sending a command for a remote computing system on-board or off-board of the rail vehicle system to perform the processing task. In one example where the operational task is a propulsive/braking output, re-assigning includes sending a command for a spare propulsive/braking resource to adjust operation to meet the propulsive/braking output.

At 512, the method includes adjusting rail vehicle system operation to reduce the operational load to comply with the reduced capability of the distributed rail vehicle system resources. In one example where the operational load is a processing load, adjusting rail vehicle operation includes cancelling a processing task or delaying a processing task from being carried out until a processing resource becomes available. In one example where the operational load is a propulsive/brake load, adjusting rail vehicle operation includes reducing travel speed or operating a different brake component. Furthermore, in cases where the operational load is less than the collective capability of the remaining distributed resources, the operational task can be re-assigned to a remaining available resource.

By re-assigning operational tasks to distributed resources of the rail vehicle system and/or a wayside device in response to resource degradation or unavailability, the operational load is still met by the remaining resources. In this way, the rail vehicle system is made more robust since operation is maintained even when a rail vehicle system resource degrades. Moreover, by sending data communications through the wayside wireless network, which has a high data rate transport capability, the data communication path has the capacity to handle the intra-train data communications.

Figure 6:
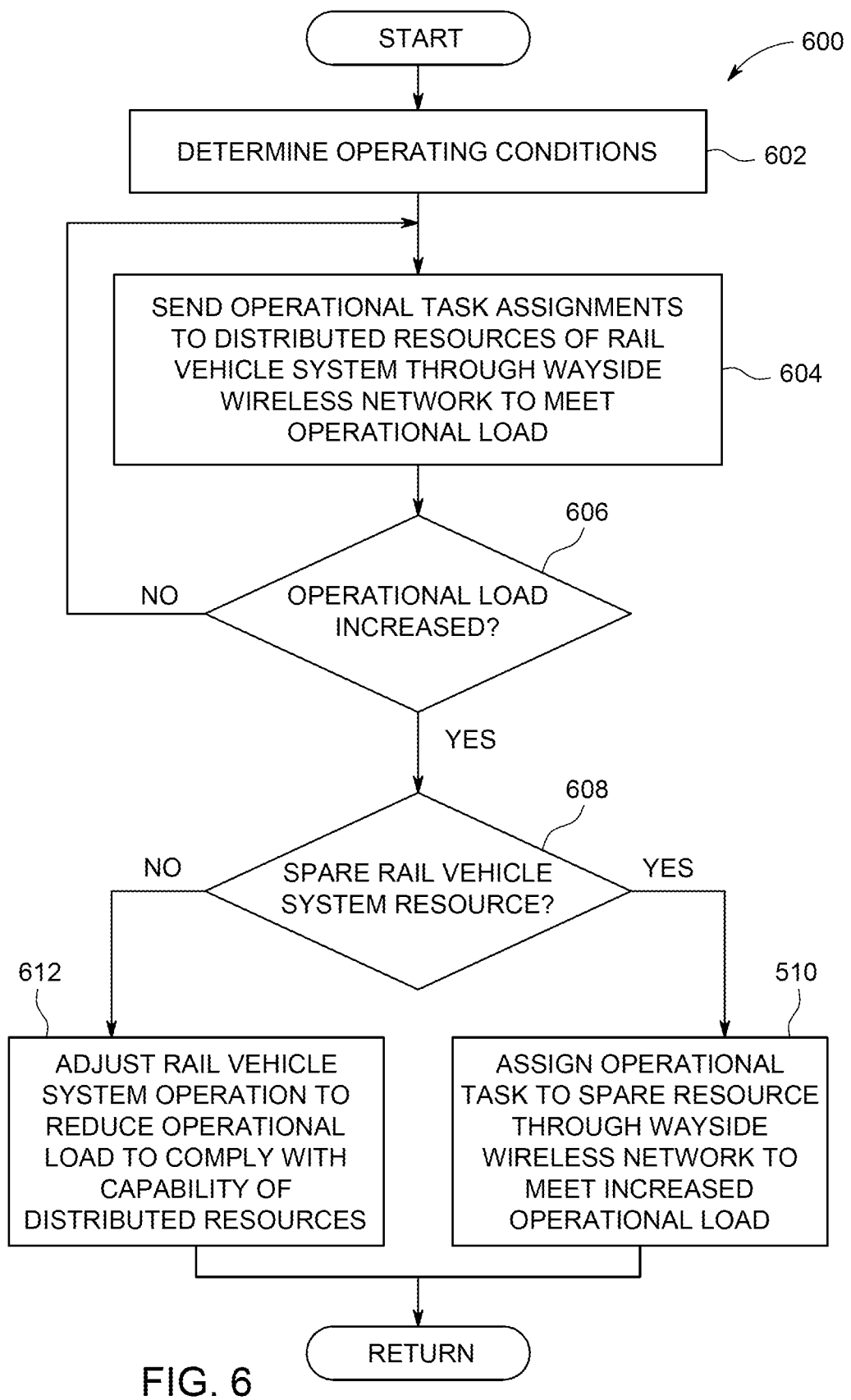
FIG. 6 is a flow diagram of an example embodiment of a method for distributing operating tasks to different remote resources of a multi-vehicle system through a wayside wireless network responsive to a change in operating load.

FIG. 6 is a flow diagram of an example embodiment of a method for distributing operational tasks to different remote resources of a multiple-unit rail vehicle configuration through a wayside wireless network responsive to a change in operational load. In one example, the method 500 is performed by the communication management system 114 of the rail vehicle system 100 depicted in FIG. 1.

At 602, the method includes determining operating conditions. Determining operating conditions includes determining whether an on-board computing system or a remote computing system of the rail vehicle system is functioning properly. Determining operating conditions includes determining an availability of data communication paths for the rail vehicle system. Determining operating conditions includes receiving rail vehicle state and location information. Determining operating conditions includes determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 604, the method includes sending, through the wayside wireless network, operational task assignments to distributed resources of the rail vehicle system to meet an operational load. In cases where the operational load is a processing load, processing tasks are assigned to available processing resources of different remote computing systems. In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle for the rail vehicle system to meet the desired travel speed.

At 606, the method includes determining if the operational load is increased. In cases where the operational load is a processing load, the operational load is increased when another processing task is generated and needs to be carried out. Non-limiting examples of processing tasks include, calculating brake distance, determining location, determining railroad track state, calculating speed for optimum fuel efficiency, etc. In cases where the operational load a propulsive load, the operational load is increased when the output (e.g., torque, speed) demand is increased. If it is determined that the operational load is increased, the method moves to 608. Otherwise, the method returns to 604.

At 608, the method includes determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method moves to 610. Otherwise, the method moves to 612.

At 610, the method includes assigning, through the wayside wireless network, the operational task associated with the increase in operational load to the spare rail vehicle system resource. In one example where the operational task is a processing task, assigning includes sending a command for a remote computing system on-board or off-board of the rail vehicle system to perform the processing task. In one example where the operational task is a propulsive/braking output, assigning includes sending a command for a spare propulsive/braking resource to adjust operation to meet the propulsive/braking output. In some cases, a plurality of resources is commanded to adjust operation to collectively meet the increase in operational load.

At 612, the method includes adjusting rail vehicle system operation to reduce the operational load to comply with the capability of the distributed rail vehicle system resources. In one example where the operational load is a processing load, adjusting rail vehicle operation includes cancelling a processing task or delaying a processing task from being carried out until a processing resource becomes available. In one example where the operational load is a propulsive/brake load, adjusting rail vehicle operation includes reducing output (e.g., torque demand, speed demand) or operating a different brake component. Furthermore, in cases where the operational load is less than the collective capability of the remaining distributed resources, the operational task can be assigned to a remaining available resource.

By assigning new operational tasks to distributed resources of the rail vehicle system in response to an increase in operational load, the operational load is met even as operating conditions vary. In this way, the rail vehicle system is made more robust. Moreover, by sending data communications through the wayside wireless network, which has a high data rate transport capability, the data communication path has the capacity to handle the intra-train data communications, as opposed to other data communication paths that have less bandwidth and do not have the capacity to handle some levels of data communications.

Another embodiment relates to a method for controlling data communication for a rail vehicle. The method comprises establishing (at the rail vehicle) a data communication session with a wireless network provided by a wayside device. The method further includes sending a data communication from the rail vehicle to a remote rail vehicle through the wireless network. (The rail vehicle and remote rail vehicle are in a train or other rail vehicle consist.)

In an embodiment, the wireless network provided by a wayside device is a general purpose, non-rail wireless network, meaning a wireless network set up for general communications by multiple parties (e.g., the public) and not specifically for purposes of rail vehicle communications. Examples include cellular networks and Wi-Fi "hotspots" at public commercial establishments.

In an embodiment, a wireless network is a telecommunications/computer network whose interconnections between nodes are implemented using RF signals, for purposes of data communications (e.g., transmission of addressed data packets) between nodes.

One or more embodiments disclosed herein describe a communication system and method used in conjunction with a vehicle system having plural propulsion-generating vehicles. Two or more of the propulsion-generating vehicles include wireless communication devices onboard the propulsion-generating vehicles. A first wireless communication device communicates remote data signals with a location disposed off-board the vehicle system. The remote data signals may be warning signals, such as signals communicated in a positive train control (PTC) system. As such, the first wireless communication device also is referred to as a remote wireless communication device. A second wireless communication device disposed onboard the propulsion-generating vehicles may be configured to communicate local data signals between the propulsion-generating vehicles and is also referred to as a local wireless communication device. The local data signals may be signals used to control tractive efforts or braking efforts of the propulsion-generating vehicles, such as distributed power (DP) signals.

During operation of the vehicle system, the local wireless communication device communicates local messages between the propulsion-generating vehicles in the vehicle system to coordinate operations of the propulsion-generating vehicles. The remote wireless communication device "listens" for remote data signals sent from off-board locations, such as a dispatch or another vehicle system. The remote wireless communication device can be controlled to switch from an off-board communication mode, where the remote wireless communication device communicates remote data signals, to an onboard communication mode, where the remote wireless communication device communicates local data signals.

In one example, when the remote wireless communication device is not receiving remote data signals, the remote wireless communication device is configured to switch automatically from the off-board communication mode to the onboard communication mode. In the onboard mode, the remote wireless communication device may supplement the local wireless communication device by augmenting the bandwidth provided by the local wireless communication device to communicate local data signals between the propulsion-generating vehicles. The remote wireless communication device can augment the available bandwidth by providing a separate communication data path. However, in an embodiment, even while operating in the onboard communication mode, the remote wireless communication device can "listen" for remote data signals communicated from an off-board source and may be configured to autonomously revert back to the off-board communication mode upon receiving a remote data signal.

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not therefore to be considered to be limiting of its scope. Throughout the description of the embodiments, the terms "radio link," "RF (radio frequency) link," and "RF communications" and similar terms describe a method of communicating between two nodes in a network, such as a lead and a remote locomotive of a distributed power train. It should be understood that the communications between nodes in the system is not limited to radio or RF systems or the like and is meant to cover all techniques by which messages may be delivered from one node to another or to plural others, including without limitation, magnetic systems, acoustic systems, and optical systems. Likewise, the inventive subject matter is not limited to a described embodiment in which RF links are used between nodes and the various components are compatible with such links.

Figure 7:
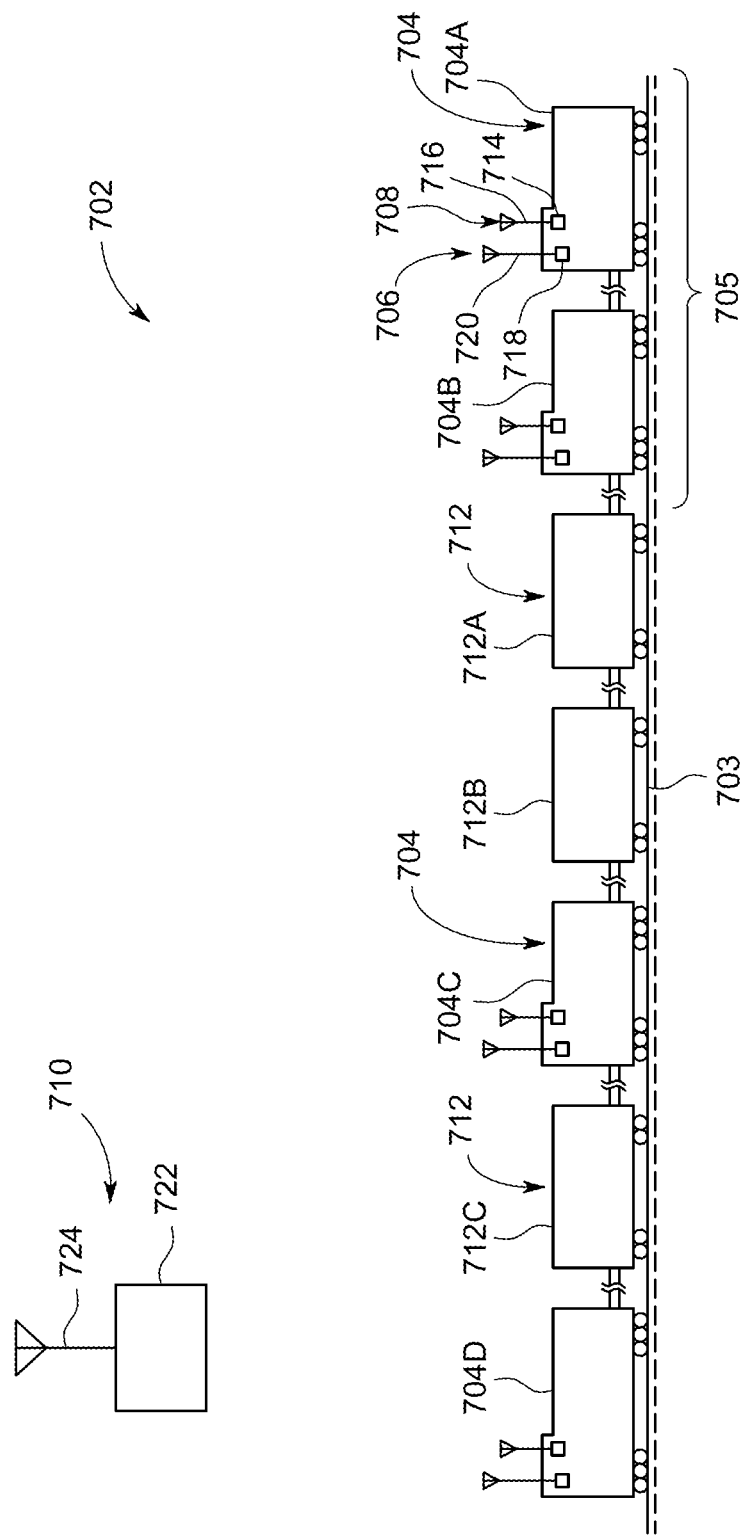
FIG. 7 schematically illustrates a communication system including a vehicle system and an off-board signaling device in accordance with an embodiment.

FIG. 7 schematically illustrates a communication system 700 including a vehicle system 702 and an off-board signaling device 710 in accordance with an embodiment. The vehicle system 702, traveling along a route 703, includes two or more propulsion-generating vehicles 704 (e.g., vehicles 704A-D) that are mechanically interconnected with each other to travel along the route 703 together. Two or more of the propulsion-generating vehicles 704 may be directly connected to form a group or consist 705, as illustrated in FIG. 7. Additionally, one or more propulsion-generating vehicles 704 may optionally be spaced apart from other propulsion-generating vehicles 704, and directly connected instead to one or more non-propulsion-generating vehicles 712 (e.g., vehicles 712A-C). Optionally, the vehicles 704 in the vehicle system 702 may not be mechanically coupled with each other, but may be logically coupled with each other, as described above. The non-propulsion-generating vehicles 712 may be configured to carry a load for transport and are propelled along the route 703 by the propulsion-generating vehicles. The number and arrangement of the propulsion-generating vehicles 704 and non-propulsion-generating vehicles 712 illustrated in FIG. 7 is merely an example, as other embodiments of the inventive subject matter may use different vehicle 704, 712 arrangements and/or different numbers of vehicles 704 and/or 712. For example, the vehicle system 702 may include a greater proportion of non-propulsion-generating vehicles 712 to propulsion-generating vehicles 704.

The propulsion-generating vehicles 704 supply motive power and braking action for the vehicle system 702. Tractive and braking efforts for the vehicle system 702 may be coordinated and shared among the propulsion-generating vehicles 704. In one embodiment, one propulsion-generating vehicle 704 is designated as a lead (or active) unit. The lead unit issues command messages to one or more propulsion-generating vehicles 704 designated as remote units. The command messages may be transmitted wirelessly as local data signals from the lead unit to the remote units. The command messages may include, for example, messages ordering the remote units to apply, increase, or decrease tractive efforts or to apply, increase, or decrease braking efforts. In one embodiment, the command messages may be DP commands that coordinate control of tractive effort and/or braking by partitioning the required motive output among the propulsion-generating vehicles 704 in the vehicle system 702. In transmitting the command messages, the lead unit may operate to delegate to each of the remote units or consists a requested motive output. For example, to slow the vehicle system 702, the lead unit may command the remote units to apply braking efforts. The requested motive output commands may vary among the propulsion-generating vehicles 704.

The lead unit may optionally be the front propulsion-generating vehicle 704A in the vehicle system 702. Or, the lead unit may be located elsewhere. In the illustrated arrangement where the lead unit is the front propulsion-generating vehicle 704A, the propulsion-generating vehicles 704C and 704D may be remote units, while vehicle 704B forms a consist with the lead unit 704A. In other embodiments the lead unit may be a propulsion-generating vehicle 704 located away from the front of the vehicle system 702, such as vehicles 704B, 704C, or 704D. It should be noted that all propulsion-generating vehicles 704 may be substantially similar in form, with each having the operative capability to serve as the designated lead unit. For illustrative purposes only, the lead unit will hereafter be referred to as propulsion-generating vehicle 704A, while the remote units will be referred to as 704C-D.

In one embodiment, the vehicle system 702 may be a train configured to operate on rails. In this embodiment, the propulsion-generating vehicles 704 may be locomotives interspersed among a plurality of rail cars (e.g., the non-propulsion vehicles 712) throughout the length of the train to supply motive power and braking action for the train. In other embodiments, the propulsion-generating vehicles 704 may be other off-highway vehicles (e.g., mining vehicles and other vehicles that are not designed for or permitted to travel on public roadways), automobiles (e.g., vehicles that are designed for traveling on public roadways), marine vessels, and the like.

The propulsion-generating vehicles 704 may include two or more wireless communication devices disposed onboard the propulsion-generating vehicle 704, such as a remote wireless communication device 706 and a local wireless communication device 708. The remote wireless communication devices 706 are configured to communicate both remote data signals and local data signals. Data signals as used herein may include audio signals such as voice signals, video signals, digital data signals, and the like. The remote data signals are transmitted from locations off-board the vehicle system 702 (e.g., other vehicle systems, dispatch facilities, wayside transponders, and the like), while the local data signals are transmitted between propulsion-generating vehicles 704 on the vehicle system 702 itself. The remote wireless communication devices 706 may include transceivers 718, antennas 720, and associated circuitry and software. The remote wireless devices 706 include a bandwidth which allows the remote data signals to be transmitted on various frequencies, which allows for simultaneous transmission of multiple control signals. The remote wireless communication devices 706 may be configured with long ranges to receive remote data signals sent from remote sources located relatively far away. For example, the remote wireless communication device 706 may have a range up to 40 miles or more. For example, the remote data signals may be transmitted at high frequency ranges (e.g., around 3-30 MHz) and/or very high frequency ranges (e.g., around 30-300 MHz) to allow for such long-range transmission. In an embodiment, the remote wireless communication device 706 may be a radio device (e.g., a 220 MHz radio, a 12R3D radio, or the like), with the ability to receive and send remote and local data signals sent along various frequencies and channels.

In the illustrated embodiment, the remote wireless communication devices 706 on the propulsion-generating vehicles 704 are configured to communicate with an off-board signaling device 710 that is located remotely from the vehicle system 702. The off-board signaling device 710 may also include a transceiver 722, an antenna 724, and associated circuitry and software. The off-board signaling device 710 may be located at a command dispatch, on another vehicle system, at various route locations, or the like, within range of the remote wireless communication devices 706. The off-board signaling device 710 communicates with the remote wireless communication devices 706 by sending remote data signals.

The remote data signals may contain embedded control signals. The control signals may relate to matters that affect the operation of the vehicle system 702. For example, the control signals may warn an operator of the vehicle system 702 of a changing route condition, such as a change in the speed limit, an upcoming section of the route being occupied by another vehicle system, an upcoming section of the route being damages, and the like. The remote data signals communicated from the off-board signaling device 710 may be useful along congested areas of the route, such as in urban areas.

In an embodiment, the remote data signals may be positive train control (PTC) signals. For example, the off-board signaling device 710 may be a wayside transponder installed at various block points and/or route locations that send PTC signals to the vehicle system 702 when the vehicle system 702 is near (e.g., within a designated range) to the wayside transponder. The PTC signals may warn of a change in an authorized speed limit for an upcoming section of the route. The remote wireless communication devices 706 on the propulsion-generating vehicles 704 receive the PTC signals. In response, the propulsion-generating vehicles 704 may autonomously adjust tractive efforts and/or braking efforts according to the communicated speed limit. Furthermore, the propulsion-generating vehicles 704 may adjust the tractive effort by coordinating efforts using the local wireless communication devices 708 to communicate local data signals, as described below.

The local data signals are communicated between propulsion-generating vehicles 704 on the vehicle system 702. The local data signals may contain embedded control signals to coordinate tractive efforts and braking efforts among the propulsion-generating vehicles 704. The control signals may be transmitted and received in the form of voice messages or data messages. The control signals may relate to functions local to the vehicle system 702, such as operational control signals used to direct the tractive and braking efforts of the propulsion-generating vehicles 704 and safety control signals used to stop movement of the propulsion-generating vehicles 704 when one or more safety regulations are violated. Additional local data signals may include confirmation signals sent to acknowledge receipt of a received control signal and status signals sent to communicate a current status of a propulsion-generating vehicles 704 and operating parameters of machinery thereof (e.g., the actual power outputs generated by other propulsion-generating vehicles, lubricant and/or water temperatures, and the like). In an embodiment, the local data signals may be DP signals sent between lead and remote units to allocate power outputs for tractive and braking efforts among the propulsion-generating vehicles 704 on the vehicle system 702 when the total power output is distributed.

The local wireless communication devices 708 are disposed onboard the propulsion-generating vehicles 704 and are configured to communicate local data signals between the propulsion-generating vehicles 704 in the vehicle system 702. The local wireless devices 708 each include a transceiver 714, an antenna 716, and associated circuitry and software, which allow the local wireless devices 708 to both send and receive wireless signals, such as through RF links and the like. The local wireless devices 708 include a bandwidth which allows the local data signals to be transmitted on various frequencies and channels, which allows for simultaneous transmission of multiple control signals. For example, the remote data signals may be transmitted at medium frequency ranges (e.g., around 300 kHz-3 MHz) and high frequency ranges (e.g., around 3-30 MHz) to allow for such transmission between propulsion-generating vehicles 704 that may be spaced up to a mile or more apart along the vehicle system 702. In an embodiment, the local wireless device 708 may be a radio device.

In an embodiment, remote and local data signals may be transmitted simultaneously using different frequencies, channels, or timing patterns, among others. For example, remote data signals for off-board communications may be transmitted along a bandwidth at higher frequencies than the local data signals are transmitted for onboard communications. In an embodiment, the remote wireless device 706 may be configured with a larger bandwidth than the local wireless device 708 on a propulsion-generating vehicle 704. Therefore, even if the bandwidth of the local wireless device 708 is congested, the remote wireless communication device 706 may be able to communicate at frequencies beyond the range of the local wireless device 708 (e.g., at frequencies above the upper limit of the local wireless communication device available bandwidth).

The local wireless communication devices 708 may transmit DP control signals among the propulsion-generating vehicles 704. For example, the propulsion-generating vehicle 704 designated as lead unit 704A may send a control signal to change tractive effort provided by one or more designated remote units 704C-D. The local wireless communication device 708 on the lead unit 704A may send a series of such control signals to ensure the receipt by the local wireless communication devices 708 on the remote units 704C-D. Upon receipt, the remote units 704C-D may be configured to implement the control signals and use the local wireless communication devices 708 to send confirmation signals back to the lead unit 704A. For example, the control signal may have originally been sent by the off-board signaling device 710 as a remote data signal received by the remote wireless communication device 706 on the lead unit 704A and transmitted to the remote units 704C-D as a local data signal using the local wireless communication devices 708.

Figure 8:
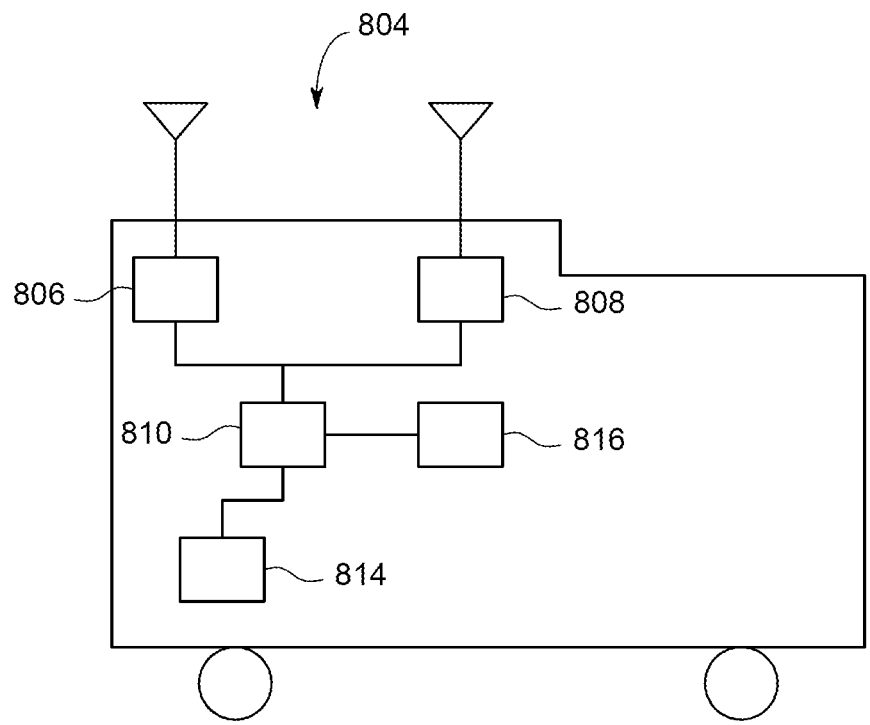
FIG. 8 schematically illustrates a propulsion-generating vehicle in accordance with an embodiment.

FIG. 8 schematically illustrates a propulsion-generating vehicle 804 in accordance with an embodiment. The propulsion-generating vehicle 804 may represent one or more of the propulsion-generating vehicles 704 (shown in FIG. 7) disposed on the vehicle system 702. The propulsion-generating vehicle 804 includes both a remote wireless communication device 806 and a local wireless communication device 808 located onboard the vehicle 804. The remote and local wireless communication devices 806, 808 may represent the respective remote and local wireless communication device 706, 708 (both shown in FIG. 7). The propulsion-generating vehicle 804 also includes a controller 810 operatively and electrically connected to the remote and local wireless communication devices 806, 808. The controller 810 may also be operatively and electrically connected to a propulsion system 814 on the propulsion-generating vehicle 804. Additionally, the controller 810 may connect to one or more input and/or output devices 816 ("Input/Output 816" in FIG. 8) onboard the vehicle 804.

The propulsion system 814 can represent one or more engines, motors, brakes, batteries, cooling systems (e.g., radiators, fans, etc.), and the like, that operate to generate power and propel the vehicle system 702. For example, the propulsion system 814 supplies motive power to propel the vehicle system 702 during a tractive effort and supplies braking power to slow the vehicle system 702 during a braking effort. The type and amount of power for the propulsion system 814 to supply is controlled by the controller 810. One or more propulsion systems 814 may be provided onboard the propulsion-generating vehicle 804.

The input and/or output devices 816 may include one or more keyboards, throttles, switches, buttons, pedals, microphones, speakers, displays, and the like. The input and/or output devices 816 may be used by an operator to provide input and/or monitor output of one or more systems of the vehicle system 702. For example, a display may show an operator a readout of a received control signal, a sent control signal, and/or an activity of the propulsion system 814 in response to a control signal. This information may also be sent to a remote location, such as at a dispatch, where the information is shown on a remote display. The devices 816 may include a user interface configured to receive input control signals from an operator in the propulsion-generating vehicle 804. For example, the operator may use the user interface to increase the velocity of the vehicle system 702. The input command on the user interface is conveyed to the controller 810, which carries out the command by, for example, conveying a control signal to the propulsion system 814 to increase tractive efforts.

The controller 810 is configured to control operations of the vehicle system 702. A vehicle system or consist may include only a single propulsion-generating vehicle that includes the controller 810 as described herein. The other propulsion-generating vehicles in the vehicle system and/or consist may be controlled based on instructions received from the propulsion-generating vehicle 804 that has the controller 810. Alternatively, several propulsion-generating vehicles 804 may include the controllers 810 and assigned priorities among the controllers 810 may be used to determine which controller 810 controls operations of the propulsion-generating vehicles 804. For example, an overall vehicle control system may include two or more of the controllers 810 disposed onboard different propulsion-generating vehicles 804 that communicate with each other to coordinate operations of the vehicles 804 as described herein.

The controller 810 performs various operations. The controller 810 may represent a hardware and/or software system that operates to perform one or more functions described herein. For example, the controller 810 may include one or more computer processor(s) or other logic-based device(s) that perform operations based on instructions stored on a tangible and non-transitory computer readable storage medium. Alternatively, the controller 810 may include one or more hard-wired devices that perform operations based on hard-wired logic of the devices. The controller 810 shown in FIG. 8 may represent the hardware that operates based on software or hardwired instructions, the software that directs hardware to perform the operations, or a combination thereof.

As illustrated in FIG. 8, the controller 810 may operatively and electrically connect to wireless communication devices 806, 808, the propulsion system 812, and the input and/or output devices 816, among other systems and devices, on the propulsion-generating vehicle 804. The controller 810 also controls the propagation of control signals between these devices and systems. In one embodiment, the controller 810 may receive signals from the remote wireless communication device 806, the local wireless communication device 808, and the input devices 816, among others. After receiving the signals, the controller 810 then determines a proper course of action, which could be based on a control algorithm. The control algorithm may assign priorities to received control signals, such that for example direct inputs from the input devices 816 take precedent over received remote control signals, which take precedent over received local control signals. Proper courses of action for the controller 810 in response to control signals could include having the remote wireless communication device 806 and/or the local wireless communication device 808 transmit data signals, ordering the propulsion system 814 to increase or decrease tractive or braking efforts, and/or displaying the determined course of action on the output devices 816, among others.

For example, when a remote data signal is received by the remote wireless communication device 806, the communication device 806 conveys the signal to the controller 810. In response, if the remote data signal is a control signal to decrease the speed of the vehicle system 802, the controller 810 is configured to signal the propulsion system 814 to increase braking efforts accordingly. In addition, the controller 810 may display the current speed of the vehicle system 802 or other information on a display output device 816 for an operator to view. Furthermore, the controller 810 may control the remote wireless communication device 806 to send a confirmation signal back to the off-board location that was the source of the remote data signal. The controller 810 may also control the local wireless communication device 808 to send local data signals to other propulsion-generating vehicles 804 on the vehicle system 802 with a control signal to also increase braking efforts.

In another example, when the controller 810 receives a local control signal from either the remote wireless communication device 806 or the local wireless communication device 808, the controller 810 may be configured, among other actions, to change one or more tractive or braking efforts of the propulsion system 814 on the propulsion-generating vehicle 804 in response to the control signal. In addition, the controller 810 may be configured to use the wireless communication devices 806, 808 to coordinate the tractive or braking efforts of the propulsion-generating vehicle 804 with other propulsion-generating vehicles and/or consists in the vehicle system 802.

In one embodiment, the remote wireless communication device 806 may be configured to communicate both remote data signals and local data signals. When the remote device 806 communicates remote data signals transmitted between the vehicle system 802 and an off-board location, the remote device 806 may be referred to as operating in an off-board communication mode. When the remote device 806 communicates local data signals between the propulsion-generating vehicles 804 of the vehicle system 802, the remote device 806 is operating in an onboard communication mode.

The off and onboard communication modes may or may not be exclusive. For example, in one embodiment, when the remote device 806 functions in the off-board mode it only communicates remote data signals, not local signals, and when the remote device 806 functions in the onboard mode it only communicates local signals, not remote signals until the mode switches. In other embodiments, the modes may not be exclusive and the remote device 806 may be configured to communicate both local and remote signals concurrently in one or either mode. For example, the communications may be interleaved or multiplexed, or the remote device 806 may have multiple transceivers to allow for concurrent signal communication.

The remote wireless communication device 806 may be controlled to switch between off-board and onboard communication modes. In one embodiment, when the remote wireless communication device 806 is in the off-board communication mode, the local data signals are transmitted between propulsion-generating vehicles 804 using the local wireless communication device 808 only. As such, the local data signals are transmitted on frequencies within the defined bandwidth of the local wireless communication device 808. Switching the remote wireless communication device 806 to the onboard mode augments the available bandwidth used to communicate local data signals for the vehicle system 802. For example, the remote wireless communication device 806 may have a wider bandwidth than the local wireless communication device 808 which allows the remote device 806 to communicate local signals at frequencies beyond the frequency range of the local device 808, such as at higher frequencies. As another example, the remote wireless communication device 806 may communicate local signals at different RF channels and/or at different timing patterns than the local wireless communication device 808. Therefore, local data signals may be transmitted between propulsion-generating vehicles 804 over a "separate path" using the remote wireless communication device 806, which eases bandwidth congestion.

Because of relieved bandwidth congestion, additional and/or more complex local data signals may be transmitted when the remote wireless communication device 806 operates in the onboard mode. For example, with an increased bandwidth for local signals, each propulsion-designated vehicle designated as a remote unit in a DP system may be able to send additional remote signals to the lead unit. If the lead unit were to request status updates, now each remote unit would be able to transmit its own status and the statuses it has received from other remote units. The result would be less communication failure between the lead and remote units.

The controller 810, in an embodiment, is configured to control the switching of the remote wireless communication device 806 between the off-board and onboard communication modes. As such, the controller 810 determines whether the remote wireless communication device 806 communicates local data signals or remote data signals. The determination to switch may be based on a programmed setting in the controller 810, operator input through an input device 816, receipt of a signal to switch, and the like, as described herein.

When the remote wireless communication device 806 is in the onboard communication mode, both wireless communication devices 806, 808 are configured to receive and send local data signals. The types of local data signals communicated by each of the wireless communication devices 806, 808 may be the same or different. For example, the remote wireless communication device 806 may transmit a first type of local data signal while the local wireless communication device 808 transmits a second type, and each type may be used by the controller 810 to control different operations of the propulsion-generating vehicle 804. The controller 810 may be configured to determine which local data signals are transmitted by each wireless communication device 806 and 808 based on factors, such as the importance, size, and other characteristics of the local data signals to be transmitted, and the available bandwidth of the communication devices 806, 808 at the time.

For example, if the received local data signal contains a safety control signal (used to stop movement of the propulsion-generating vehicles 804 when one or more safety regulations are violated), the controller 810 may assign both wireless communication devices 806, 808 to communicate the safety control signal to other propulsion-generating vehicles 804 to enhance the propagation of the signal throughout the vehicle system 802 and lead to a quicker response time (e.g., stoppage time). However, if the received local data signal contains an operational control signal (e.g. increase tractive efforts), determined not to be as important as a safety control signal, the controller 810 may be configured to assign only the local wireless communication device 808 to further transmit the operational control signal. The remote wireless communication device 806 then has more bandwidth available to transmit potential upcoming received local and/or remote data signals.

In another example, if the received local data signal is determined to be large or complex (e.g., greater than a threshold data packet size or message size), the controller 810 may assign the remote wireless communication device 806 to transmit the signal when the remote device 806 is in the onboard communication mode because the remote device 806 may have extra bandwidth on which to transfer the large/complex signal. Conversely, if the received local data signal is small or simple (e.g., no larger than the threshold data packet size), the controller 810 may be configured to have the local wireless communication device 808 transmit the signal even if the remote wireless communication device 806 is in the onboard mode, because the extra bandwidth is not necessary in this situation.

The remote wireless communication device 806 is configured with the operative ability to receive and send signals within a range of up to 40 miles or more. To communicate at such large ranges, the remote wireless communication device 806 transmits data signals at a relatively large signal intensity. However, when the remote wireless communication device 806 operates in the onboard communication mode to transmit local data signals on the vehicle system 802, the range from the device 806 to the intended receivers of the signals (e.g., other propulsion-generating vehicles 804 on the same vehicle system 802) is much shorter, on the order of a less than a mile to a couple miles. Therefore, in an embodiment, the controller 810 is configured to reduce the transmission signal intensity of the remote wireless communication device 806 when the wireless device 806 switches from off-board to onboard communication mode. The transmission signal intensity is reduced because local data signals are generally only relevant to the vehicle system 802 itself. Transmitting local data signals with the same intensity as remote data signals would unnecessarily clog the RF airwaves, reducing the available bandwidth for other vehicle systems in the remote proximity.

Figure 9:
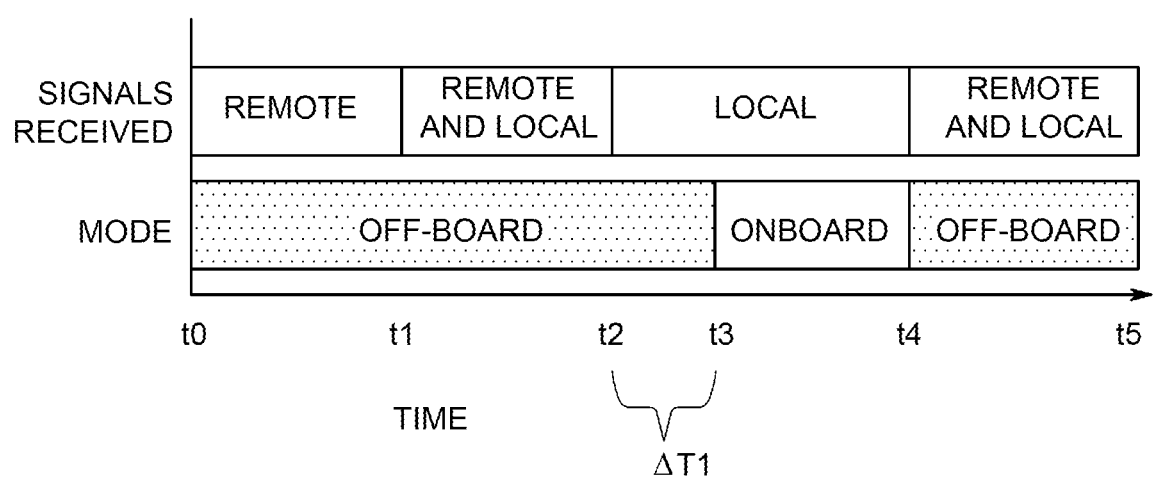
FIG. 9 illustrates a time diagram for operating a wireless communication device according to an embodiment.

FIG. 9 illustrates a timing diagram for operating the remote wireless communication device 806 according to one embodiment. The diagram shows modes of operation and signals received using the remote wireless communication device 806. In an embodiment, the remote wireless communication device 806 may switch between operating in the off-board communication mode and the onboard communication mode. The controller 810 may be configured to control the remote wireless communication device 806 and switch between the off-board and onboard communication modes.

Since both local and remote data signals may be received by the remote wireless communication device 806 within a common time period (e.g., at the same time or during overlapping time periods), the determination between operating in off-board communication mode and onboard communication mode in such a situation may be based on assigned priorities. The controller thereafter uses the assigned priorities to cause the propulsion-generating vehicle 804 to operate according to the remote data signals or the local data signals, whichever has priority.

In an embodiment, the remote data signals are assigned a higher priority than the local data signals, so the remote wireless communication device 806 operates by default in the off-board communication mode. The remote data signals may be assigned priority because the remote signals may relate to emergency safety issues, such as a stalled vehicle in the route ahead, while the messages relayed by the local signals may not generally have similar safety implications. For example, the remote data signals may be PTC signals sent from a remote dispatch monitoring the statuses of many vehicle systems, so the remote signals could implicate safety considerations beyond the local vehicle system.

The remote wireless communication device 806 may be controlled to send and receive signals that are assigned a lower priority in certain prescribed situations. For example, even though remote data signals may be assigned priority over local data signals such that the remote wireless communication device 806 operates by default in off-board communication mode, the controller 810 may switch the remote device 806 to the onboard communication mode in certain prescribed situations. Such prescribed situations may include non-receipt of the priority data signals for a set period of time, operator input, and/or receipt of a priority signal commanding the switch, among others. Thus, in one embodiment, after non-receipt of remote data signals for at least a designated time period, the controller 810 may direct the remote wireless communication device 806 to switch from the off-board communication mode to the onboard communication mode. Once in the onboard communication mode, the remote wireless communication device 806 supplements and augments an available bandwidth for transmitting local data signals between propulsion-generating vehicles 804 on the vehicle system.

In another example, the controller 810 may be configured to direct the remote wireless communication device 806 to switch from the off-board communication mode to the onboard mode upon identifying an operating failure of the local wireless communication device 808 on board the propulsion-generating vehicle 804. Therefore, if the local wireless communication device 808 is inoperable or malfunctioning, such as due to a damaged antenna, transceiver, or a flaw in the associated software and/or circuitry, the remote wireless communication device 806 may act in place of the inoperable local device 808 by communicating local data signals, such as DP signals.

In one embodiment, even while the remote wireless communication device 806 transmits low-priority data signals, the remote device 806 continues to "listen" for high-priority signals. Once a high-priority data signal is received, the remote wireless communication device 806 may be controlled to switch communication modes to transmit the newly-received high-priority data signal. For example, continuing the example above, once the remote wireless communication device 806 receives a remote data signal, the remote device 806 conveys the signal to the controller 810, and the controller 810 switches the remote device 806 back to the off-board communication mode to transmit the received remote data signal.

An example process that shows the types of signals received by the remote wireless communication device 806 and the communication mode of the remote device 806 over a period of time is shown in FIG. 9. In the diagram, remote data signals take priority over local data signals, so the default communication mode is off-board. From time t0 to t1, only remote data signals are received by the remote wireless communication device 806, so the remote device is controlled to operate in the off-board mode to transmit the remote signals. From time t1 to t2, local data signals are also received along with remote data signals, but since the remote data signals have an assigned priority over the local data signals, the remote wireless communication mode continues to operate in the off-board mode and does not transmit the received local data signals. From time t2 to t3, or $\Delta T1$, only local data signals are received but the communication mode does not switch to onboard yet because $\Delta T1$ represents a designated time period of non-receipt of priority signals before the controller 810 switches communication modes. Thereafter, the communication mode switches at time t3 to the onboard mode, and from time t3 to t4 the remote wireless communication mode augments the available bandwidth to transfer local data signals. Finally, at time t4 another remote data signal is received by the remote wireless communication device 806, and the controller 810 automatically switches communication modes back to the off-board mode to transfer the received remote signals according to the assigned priority.

Figure 10:
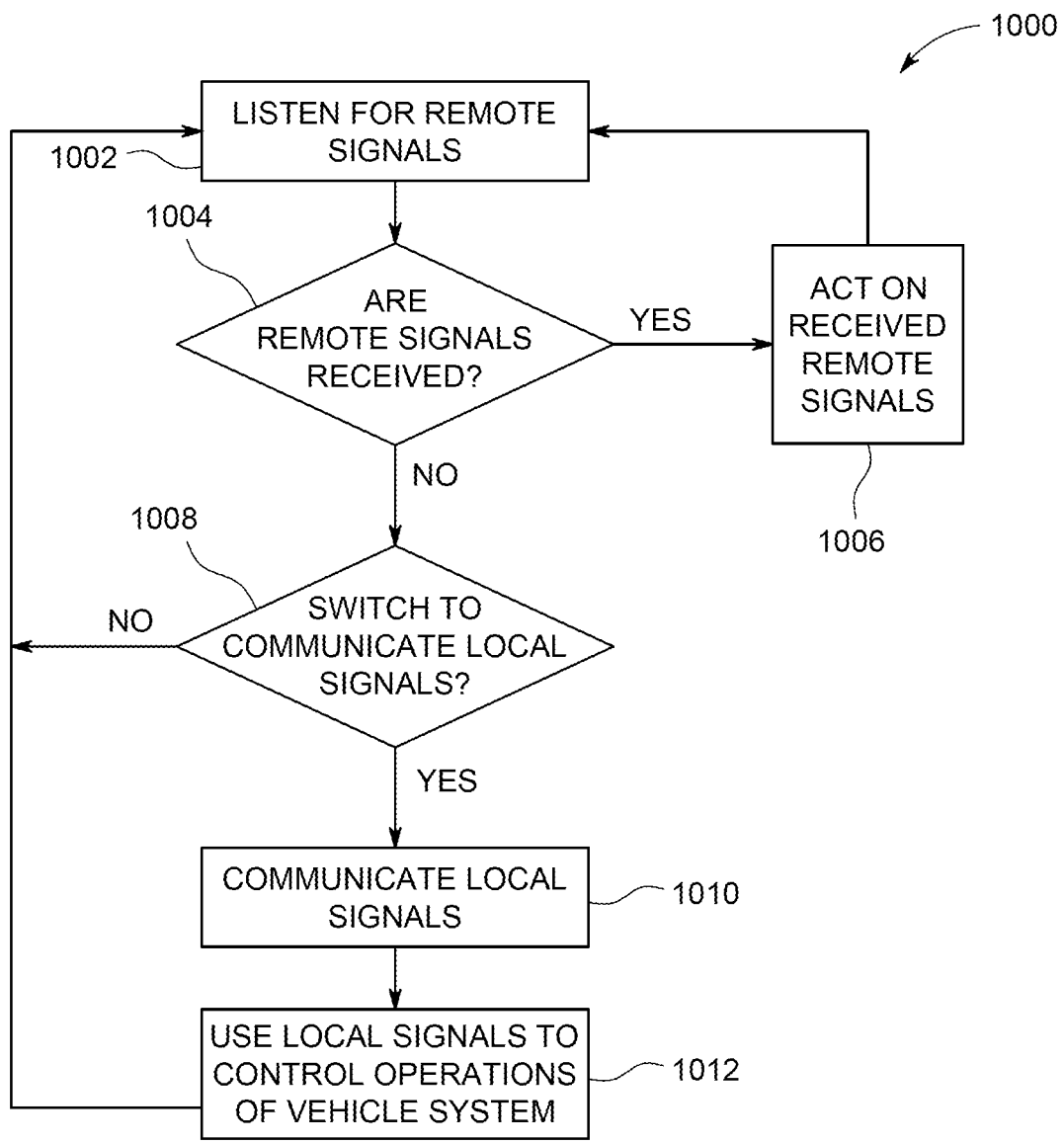
FIG. 10 is a flow diagram illustrating a signal communication method according to an embodiment.

FIG. 10 illustrates a flowchart of one embodiment of a method 1000 of communicating signals for vehicle system 702. The method 1000 is described in connection with the vehicle system 702 as shown in FIG. 7 described herein. At 1002, as the vehicle system 702 travels along the route 703, the vehicle system 702 listens for remote signals. For example, the remote wireless communication device 706 disposed onboard one or more of the propulsion-generating vehicles 704 listens for remote data signals being transmitted from locations off-board the vehicle system 702, such as PTC signals sent from a dispatch location.

At 1004, a determination is made as to whether remote signals are being received. For example, any remote signals received by the remote wireless communication device 706 may be conveyed to the controller 810 (shown in FIG. 8) for further action in response to the received remote signal. The remote signal may be related to a safety concern, so the vehicle system 702 may be configured to take prompt action to implement any messages received via remote signals. If the vehicle system 702 has received remote signals, then flow of the method 1000 may proceed to 1006.

At 1006, the vehicle system 702 acts on the received remote signal. The controller 810 may act by performing a variety of functions, including, for example, displaying a readout on a display of an output device 816 (shown in FIG. 8), controlling the propulsion system 814 (shown in FIG. 8) to increase or decrease tractive efforts or braking efforts, operating the local wireless communication device 708 to transmit signals (e.g., the received remote signal and/or additional signals) to other communication devices on the vehicle system 702, and operating the remote wireless communication device 706 to send a response signal back to the source of the received remote signal. After acting on the received remote signal, flow of the method may return to 1002 where the remote wireless communication device 706 continues to listen for remote signals.

Referring again back to 1004, if the vehicle system 702 has not received remote signals, then flow of the method 1000 may proceed to 1008. At 1008, since the remote wireless communication device 706 has not recently (e.g., within the last cycle of the method 1000) received a remote signal, a determination is made as to whether the communication device 706 should switch to communicate local signals. If no remote signals are being received, the remote wireless communication device 706 may be used to supplement the local wireless communication device 708 communicating local data signals between the propulsion-generating vehicles 704 of the vehicle system 702. However, it may not be desirable to always switch the remote wireless communication device 706 upon every determination that remote signals have not been received, as such operation could result in frequent switching which could exhaust and/or damage the controller 810, wireless device 706, and other associated hardware.

In an embodiment of the method 1000, the controller 810 may determine to switch the remote wireless communication device 706 to communicate local signals after a designated time period of non-receipt of remote signals. In this embodiment, if the amount of time from the last received remote data signal to the present time does not meet or exceed the designated time period, the determination to switch is determined in the negative. The determination whether to switch or not may also be controlled by an operator's input, a received command signal, and the like. When the determination to switch at 1008 is negative, the flow of the method 1000 returns to 1002 to listen for remote signals. When the determination to switch at 1008 is positive, such as if the designated time period of non-receipt has been met, for example, the flow of the method proceeds to 1010.

At 1010, the remote wireless communication device 706 is directed to communicate local signals. Although local signals may have a lower assigned priority than remote signals, since no remote signals have been received, the remote communication device 706 may be used to supplement the local wireless communication device 708, at least until higher priority remote signals are received. Using the remote communication device 706 to communicate local signals between propulsion-generating vehicles 704 disposed along the vehicle system 702 may relieve transmission congestion and free up bandwidth for additional signals that may reduce the number of messages that get lost in transmission. The controller 810 may coordinate the transmission of local signals, such as DP signals, between the remote and local communication devices 706, 708. After the local signals are communicated at 1010 using the remote wireless communication device 706 and/or the local wireless communication device 708, the flow of the method 1000 proceeds to 1012.

At 1012, the transmitted local signals are used to control operations of the vehicle system 702. For example, the local signals may be DP signals transmitted from a propulsion-generating vehicle 704 acting as a lead unit to one or more remote units to coordinate a total power output by allocating certain desired power outputs to the remote unit(s). After the remote wireless communication device 706 has communicated the local signals at 1010, and the local signals have been implemented to control operations of the vehicle system 702 at 1012, the flow of the method 1000 returns to 1002 so the remote communication device can listen for remote signals 1002. If no remote signals are received at 1004, then once again the determination may be made at 1008 to have the remote communication device 706 communicate local data signals since, for example, the time period since last receipt of remote signals will still exceed the designate time period.

In one embodiment, a communication system includes a first wireless communication device and a controller. The first wireless communication device is configured to be disposed onboard a vehicle system having two or more propulsion-generating vehicles that are mechanically interconnected with each other to travel along a route together. The controller is configured to be disposed onboard the vehicle system and operatively connected with the first wireless communication device to control operations of the first wireless communication device. The controller is configured to direct the first wireless communication device to switch between operating in an off-board communication mode and operating in an onboard communication mode. When the first wireless communication device is operating in the off-board communication mode, the first wireless communication device is configured to receive remote data signals from a location that is disposed off-board of the vehicle system. When the first wireless communication device is operating in the onboard communication mode, the first wireless communication device is configured to communicate local data signals between the propulsion-generating vehicles of the vehicle system.

In one aspect, the remote data signals that are communicated from the location that is off-board of the vehicle system are control signals. The first wireless communication device is configured to receive the control signals and convey the control signals to the controller. The controller is configured to change one or more tractive efforts or braking efforts of the vehicle system in response to the control signals.

In one aspect, the control signals are PTC signals.

In one aspect, the local data signals that are communicated between the propulsion-generating vehicles are control signals. The first wireless communication device is configured to receive the control signals and convey the control signals to the controller. The controller is configured to coordinate one or more tractive efforts or braking efforts of the two or more propulsion-generating vehicles according to the control signals.

In one aspect, the control signals are DP signals.

In one aspect, the first wireless communication device is configured to receive both the remote data signals and the local data signals during a common time period. The controller is configured to cause the propulsion-generating vehicles to operate according to the remote data signals or the local data signals according to priorities assigned to the remote data signals and the local data signals.

In one aspect, the remote data signals are assigned with higher priorities than the local data signals.

In one aspect, the controller is configured to direct the first wireless communication device to switch from the off-board communication mode to the onboard communication mode after non-receipt of the remote data signals for at least a designated time period.

In one aspect, the first wireless communication device is a radio device.

In one aspect, a second wireless communication device is configured to communicate the local data signals between the propulsion-generating vehicles of the vehicle system so that the controller can coordinate one or more tractive efforts or braking efforts of the propulsion-generating vehicles with each other. The controller is configured to direct the first wireless communication device to switch to the onboard communication mode to augment an available bandwidth that is used to communicate the local data signals for the vehicle system.

In one aspect, the local data signals include operational control signals and safety control signals. The operational control signals are used to direct the one or more tractive efforts or braking efforts of the propulsion-generating vehicles. The safety control signals are used to stop movement of the propulsion-generating vehicles when one or more safety regulations are violated. The second wireless communication device is configured to communicate the operational control signals. The controller is configured to direct both the first wireless communication device and the second wireless communication device to communicate the safety control signals when the first wireless communication device is in the onboard mode of operation.

In one aspect, the controller is configured to direct the first wireless communication device to communicate the local data signals that are larger than a threshold data packet size when the first wireless communication device is in the onboard mode of operation. Meanwhile, the second wireless communication device is configured to communicate the local data signals that are no larger than the threshold data packet size.

In one aspect, the controller is configured to direct the first wireless communication device to communicate the local data signals of a first type when the first wireless communication device is in the onboard mode of operation. Meanwhile the second wireless communication device is configured to communicate the local data signals of a different, second type. The first and second types of the local data signals are used to control respective different operations of the propulsion-generating vehicles.

In one aspect, the vehicle system includes two or more vehicle consists with the propulsion-generating vehicles disposed in different ones of the vehicle consists. The controller is configured to direct the first wireless communication device to communicate the local data signals between the different vehicle consists.

In one aspect, the controller is configured to reduce a signal intensity at which the first wireless communication device transmits the local control signals responsive to the first wireless communication device being switched from the off-board communication mode to the onboard communication mode.

In one embodiment, a method includes directing a first wireless communication device configured to be disposed onboard a vehicle system to operate in an off-board communication mode. The vehicle system has two or more propulsion-generating vehicles that are mechanically interconnected with each other to travel along a route together. In the off-board communication mode, the first wireless communication device is configured to receive remote data signals from a location that is disposed off-board the vehicle system. The method also includes switching the first wireless communication device from operating in the off-board communication mode to operating in an onboard communication mode. In the onboard communication mode, the first wireless communication device is configured to communicate local data signals between the propulsion-generating vehicles of the vehicle system. The method further includes controlling movement of the vehicle system responsive to receipt of the remote data signals and responsive to receipt of the local data signals.

In one aspect, the first wireless communication device is configured to receive both the remote data signals and the local data signals during a common time period. Control of the propulsion-generating vehicles of the vehicle system is responsive to the remote data signals or the local data signals according to priorities assigned to the remote data signals and the local data signals.

In one aspect, the remote data signals are assigned with higher priorities than the local data signals.

In one aspect, switching the first wireless communication device to the onboard communication mode augments an available bandwidth that is used to communicate the local data signals for the vehicle system.

In one aspect, switching the first wireless communication device from the off-board communication mode to the onboard communication mode includes reducing a signal intensity at which the first wireless communication device transmits the local control signals.

In one embodiment, a communication system includes a controller. The controller is configured to be disposed onboard a vehicle system having two or more propulsion-generating vehicles that are mechanically interconnected with each other to travel along a route together. The controller is configured to operatively connect with the propulsion-generating vehicles and a first wireless communication device. The controller is configured to direct the first wireless communication device to switch between operating in an off-board communication mode and operating in an onboard communication mode. In the off-board communication mode, the first wireless communication device is configured to receive remote data signals from a location that is disposed off-board of the vehicle system. In the onboard communication mode, the first wireless communication device is configured to communicate local data signals between the propulsion-generating vehicles of the vehicle system.

In one aspect, the remote data signals that are communicated from the location that is off-board of the vehicle system are control signals. The first wireless communication device is configured to receive the control signals and convey the control signals to the controller. The controller is configured to change one or more tractive efforts or braking efforts of the vehicle system in response to the control signals.

In one aspect, the control signals are PTC signals.

In one aspect, the local data signals that are communicated between the propulsion-generating vehicles are control signals. The first wireless communication device is configured to receive the control signals and convey the control signals to the controller. The controller is configured to coordinate one or more tractive efforts or braking efforts of the two or more propulsion-generating vehicles according to the control signals.

In one aspect, the control signals are DP signals.

In one aspect, the first wireless communication device is configured to receive both the remote data signals and the local data signals during a common time period. The controller is configured to cause the propulsion-generating vehicles to operate according to the remote data signals or the local data signals according to priorities assigned to the remote data signals and the local data signals.

In one aspect, the remote data signals are assigned with higher priorities than the local data signals.

In one aspect, the controller is configured to direct the first wireless communication device to switch from the off-board communication mode to the onboard communication mode after non-receipt of the remote data signals for at least a designated time period.

In one aspect, the controller is configured to direct the first wireless communication device to switch to the onboard communication mode to augment an available bandwidth that is used to communicate the local data signals between the propulsion-generating vehicles of the vehicle system.

In one embodiment, a communication system includes a first wireless communication device configured to be disposed onboard a vehicle system. The vehicle system has two or more propulsion-generating vehicles that are mechanically interconnected with each other to travel along a route together. The first wireless communication device configured to switch between operating in an off-board communication mode and operating in an onboard communication mode. When the first wireless communication device is operating in the off-board communication mode, the first wireless device is configured to receive remote data signals from a location that is disposed off-board of the vehicle system. When the first wireless communication device is operating in the onboard communication mode, the first wireless communication device is configured to communicate local data signals between the propulsion-generating vehicles of the vehicle system.

In one aspect, the first wireless communication device is configured to operatively connect to a controller disposed onboard the vehicle system. The controller is configured to direct the first wireless communication device to switch from the off-board communication mode to the onboard communication mode after non-receipt of the remote data signals for at least a designated time period.

In one aspect, the first wireless communication device is a radio device.

In one aspect, the communication system also includes a second wireless communication device configured to communicate the local data signals between the propulsion-generating vehicles of the vehicle system through an available bandwidth. The first wireless communication device is configured to switch to the onboard communication mode to augment the available bandwidth to communicate the local data signals.

In one aspect, the local data signals include operational control signals and safety control signals. The operational control signals are used to direct the one or more tractive efforts or braking efforts of the propulsion-generating vehicles. The safety control signals are used to stop movement of the propulsion-generating vehicles when one or more safety regulations are violated. The second wireless communication device is configured to communicate the operational control signals. Both the first wireless communication device and the second wireless communication device are configured to communicate the safety control signals when the first wireless communication device is in the onboard mode of operation.

In one aspect, the first wireless communication device is configured to communicate the local data signals that are larger than a threshold data packet size when the first wireless communication device is in the onboard mode of operation. Meanwhile, the second wireless communication device is configured to communicate the local data signals that are no larger than the threshold data packet size.

In one aspect, the first wireless communication device is configured to communicate the local data signals of a first type when the first wireless communication device is in the onboard mode of operation. Meanwhile, the second wireless communication device is configured to communicate the local data signals of a different, second type. The first and second types of the local data signals are used to control respective different operations of the propulsion-generating vehicles.

In one aspect, the vehicle system includes two or more vehicle consists with the propulsion-generating vehicles disposed in different ones of the vehicle consists. The first wireless communication device is configured to communicate the local data signals between the different vehicle consists.

In one aspect, the first wireless communication device is configured to transmit the local control signals at a reduced signal intensity compared to the signal intensity used to transmit remote data signals.

In one embodiment, a communication system includes a radio deployed onboard a first rail vehicle of a rail vehicle consist and operative in a first mode of operation and a second mode of operation. The radio is configured when operating in the first mode of operation to communicate at least one of voice signals or data signals between the first rail vehicle and a location off-board the rail vehicle consist using a first frequency bandwidth. The radio is configured when operating in the second mode of operating to wirelessly communicate distributed power signals from the first rail vehicle to one or more remote rail vehicles in the rail vehicle consist using a different, second frequency bandwidth, for at least one of augmenting operating of other onboard wireless devices that are configured to communicate the distributed power signals in the rail vehicle consist or for acting in place of at least one of the other onboard wireless devices.

In one aspect, the radio is configured to automatically operate in the second mode of operation when the radio is not operating in the first mode of operation to communicate the at least one of the voice signals or the data signals from between the first rail vehicle and the location off-board the rail vehicle consist.

In an embodiment, a system (e.g., a locomotive communication system) includes a wireless communication device and a controller. The wireless communication device is configured to be disposed onboard a vehicle system having propulsion-generating vehicles. The controller is configured to be disposed onboard the vehicle system and operatively connected with the wireless communication device to control operation of the wireless communication device. The controller is configured to direct the wireless communication device to switch between operating in an off-board communication mode and operating in an inter-vehicle communication mode. The wireless communication device is configured to communicate a remote data signal with an off-board location while the wireless communication device is operating in the off-board communication mode. The wireless communication device is also configured to communicate a local data signal between the propulsion-generating vehicles of the vehicle system while the wireless communication device is operating in the inter-vehicle communication mode. The local data signal may be a control signal for one of the propulsion-generating vehicles to control propulsion and braking of the vehicle system and/or one or more of the propulsion-generating vehicles, e.g., for coordinated movement along a route. The remote data signal may include operational data of the vehicle system, and/or it may include a control signal by which an off-board controller (a controller not on board any vehicle) controls propulsion and/or braking of the vehicle system.

In an embodiment, a system (e.g., a locomotive communication system) includes respective wireless communication devices and controllers onboard plural propulsion-generating vehicles of a vehicle system. That is, each propulsion-generating vehicle of the vehicle system includes a respective wireless communication device and controller. The controllers are respectively operatively connected with the wireless communication devices to control operation of the wireless communication devices. The controllers are configured to direct the wireless communication devices to switch between operating in an off-board communication mode and operating in an inter-vehicle communication mode. Each wireless communication device is configured to communicate a remote data signal with an off-board location while the wireless communication device is operating in the off-board communication mode. Each wireless communication device is also configured to communicate a local data signal between the propulsion-generating vehicles of the vehicle system while the wireless communication device is operating in the inter-vehicle communication mode. The local data signal may include control signals by which one of the propulsion-generating vehicles controls propulsion and braking of one or more other propulsion-generating vehicles of the vehicle system, e.g., for coordinated movement along a route. The remote data signal may include operational data of the vehicle system, and/or it may include a control signal by which an off-board controller (a controller not on board any vehicle) controls propulsion and/or braking of the vehicle system.

In an embodiment, a method includes directing a wireless communication device disposed onboard a vehicle system to operate in an off-board communication mode. The vehicle system has two or more propulsion-generating vehicles. The wireless communication device is configured to receive a remote data signal from an off-board location while in the off-board communication mode. The method also includes switching the wireless communication device from operating in the off-board communication mode to operating in an inter-vehicle communication mode, wherein the wireless communication device communicates a local data signal between the propulsion-generating vehicles of the vehicle system while in the inter-vehicle communication mode. The method further includes controlling movement of the vehicle system responsive to receipt of one or more of the remote data signal or the local data signal. For example, the local data signal may include a control signal for one of the propulsion-generating vehicles to control propulsion and braking of one or more of the other propulsion-generating vehicles. Also, as another example, alternatively or additionally, the remote data signal may include a control signal for an off-board controller (a controller not onboard any vehicle) to control propulsion and/or braking of the vehicle system and/or one or more of the propulsion-generating vehicles.

In an embodiment, a system (e.g., a locomotive communication system) includes a controller configured to be disposed onboard a vehicle system having two or more propulsion-generating vehicles. The controller is configured to operatively connect with the propulsion-generating vehicles and a wireless communication device. The controller is configured to direct the wireless communication device to switch between operating in an off-board communication mode and operating in an inter-vehicle communication mode. In the off-board communication mode, the wireless communication device is configured to receive remote data signals from a location that is disposed off-board of the vehicle system and, in the inter-vehicle communication mode, the wireless communication device is configured to communicate local data signals between the propulsion-generating vehicles of the vehicle system. The local data signal may include a control signal for one of the propulsion-generating vehicles to control propulsion and braking of one or more of the other propulsion-generating vehicles. Also, alternatively or additionally, the remote data signal may include a control signal for an off-board controller (a controller not onboard any vehicle) to control propulsion and/or braking of the vehicle system and/or one or more of the propulsion-generating vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A vehicle communication system comprising:
a controller configured to be disposed onboard a vehicle system and operatively connected with a wireless communication device to control operation of the wireless communication device, the controller configured to direct the wireless communication device to switch between operating in an off-board communication mode and operating in an onboard communication mode,
wherein, the wireless communication device is configured to communicate a remote data signal with an off-board location while the wireless communication device is operating in the off-board communication mode and the wireless communication device is configured to communicate a local data signal between vehicles in the vehicle system while the wireless communication device is operating in the onboard communication mode.

2. The vehicle communication system of claim 1, wherein the wireless communication device is configured to communicate the remote data signal as a control signal, and the controller is configured control one or more of a tractive effort or a braking effort of the vehicle system based on the control signal.

3. The vehicle communication system of claim 1, wherein the local data signal that is communicated between the vehicles is a control signal that the controller is configured to use to coordinate one or more of a tractive effort or a braking effort of at least one of the vehicles based on the control signal.

4. The vehicle communication system of claim 1, wherein the wireless communication device is configured to receive both the remote data signal and the local data signal at the same time, and the controller is configured to direct at least one of the vehicles to operate according to only the remote data signal or only the local data signal according to priorities associated with the remote data signal and the local data signal.

5. The vehicle communication system of claim 4, wherein the remote data signal is assigned with a higher priority than the local data signal.

6. The vehicle communication system of claim 1, wherein the controller is configured to direct the wireless communication device to switch from the off-board communication mode to the onboard communication mode responsive to not receiving the remote data signal for at least a designated time period.

7. The vehicle communication system of claim 1, wherein the wireless communication device is a radio device.

8. The vehicle communication system of claim 1, wherein the wireless communication device is a first wireless communication device, and further comprising a second wireless communication device configured to communicate the local data signal between the vehicles of the vehicle system so that the controller can coordinate one or more of a tractive effort or a braking effort of the vehicles with each other.

9. The vehicle communication system of claim 8, wherein the controller is configured to direct the first wireless communication device to switch to the onboard communication mode to augment a bandwidth used to communicate the local data signal for the vehicle system.

10. The vehicle communication system of claim 8, wherein the second wireless communication device is configured to communicate the local data signal to control the one or more of the tractive effort or the braking effort of the vehicles while the first wireless communication device is in the off-board communication mode and while the second wireless communication device is in the onboard communication mode, and
wherein the controller is configured to direct the second wireless communication device to switch from communicating the local data signal to communicating a safety control signal used to stop movement of the vehicles responsive to one or more safety regulations being violated.

11. The vehicle communication system of claim 10, wherein the controller is configured to direct the first wireless communication device to also communicate the safety control signal.

12. The vehicle communication system of claim 8, wherein the controller is configured to direct the first wireless communication device to communicate the local data signal that is larger than a threshold data size and is configured to direct the second wireless communication device to communicate the local data signal that is no larger than the threshold data size.

13. The vehicle communication system of claim 8, wherein the controller is configured to direct the first wireless communication device to communicate the local data signal to control a first operation of the vehicles and to direct the second wireless communication device to communicate the local data signal to control a different, second operation of the vehicles.

14. The vehicle communication system of claim 13, wherein the controller is configured to direct the first wireless communication device to not communicate the local data signal to control the second operation of the vehicles and the controller is configured to direct the second wireless communication device to not communicate the local data signal to control the first operation of the vehicles.

15. The vehicle communication system of claim 1, wherein the controller is configured to reduce a signal intensity at which the wireless communication device communicates the local data signal responsive to the wireless communication device being switched from the off-board communication mode to the onboard communication mode.

16. A method comprising:
directing a wireless communication device disposed onboard a vehicle system to operate in an off-board communication mode to receive a remote data signal from an off-board location;
switching the wireless communication device from operating in the off-board communication mode to operating in an onboard communication mode to communicate a local data signal between vehicles in the vehicle system; and controlling movement of the vehicle system responsive to receipt of one or more of the remote data signal or the local data signal.

17. The method of claim 16, wherein switching the wireless communication device to the onboard communication mode augments an available bandwidth that is used to communicate the local data signal within the vehicle system.

18. The method of claim 16, wherein switching the wireless communication device from the off-board communication mode to the onboard communication mode comprises reducing a signal intensity at which the wireless communication device communicates the local data signal.

19. A vehicle communication system comprising:

a controller configured to communicatively connect with vehicles in a vehicle system and with a wireless communication device, the controller configured to direct the wireless communication device to switch between operating in an off-board communication mode and operating in an onboard communication mode, the controller configured to direct the wireless communication device to receive remote data signals from an off-board location while operating in the off-board communication mode, the controller configured to direct the wireless communication device to communicate local data signals between the vehicles of the vehicle system while operating in the onboard communication mode.

20. The vehicle communication system of claim 19, wherein the controller is configured to direct the wireless communication device to receive both the remote data signals and the local data signals at the same time, and the controller is configured to control the vehicles to operate according to the remote data signals or the local data signals according to priorities assigned to the remote data signals and the local data signals.

* * * * *